(12) United States Patent
Halmos et al.

(10) Patent No.: US 9,730,398 B2
(45) Date of Patent: Aug. 15, 2017

(54) CONFIGURABLE MODULAR HYDROPONICS SYSTEM AND METHOD

(71) Applicants: Nicholas Halmos, Santa Crua, CA (US); Quentin Lindh, Santa Cruz, CA (US); Alexis Walker, Santa Cruz, CA (US)

(72) Inventors: Nicholas Halmos, Santa Crua, CA (US); Quentin Lindh, Santa Cruz, CA (US); Alexis Walker, Santa Cruz, CA (US)

( * ) Notice: Subject to any disclaimer, the term of this patent is extended or adjusted under 35 U.S.C. 154(b) by 97 days.

(21) Appl. No.: 13/843,434

(22) Filed: Mar. 15, 2013

(65) Prior Publication Data
US 2014/0259908 A1    Sep. 18, 2014

(51) Int. Cl.
*A01G 31/02*    (2006.01)

(52) U.S. Cl.
CPC ............ *A01G 31/02* (2013.01); *Y02P 60/216* (2015.11)

(58) Field of Classification Search
CPC ......... A01G 31/00; A01G 31/02; A01G 31/06
USPC ...... 47/48.5, 59 R, 60, 62 C, 62 E, 62 R, 63; 312/324, 326, 327, 328
See application file for complete search history.

(56) References Cited

U.S. PATENT DOCUMENTS

| | | | | |
|---|---|---|---|---|
| 376,242 | A | * | 1/1888 | Goetz ............................. 47/16 |
| 557,095 | A | * | 3/1896 | Tate .............................. 312/211 |
| 1,123,281 | A | * | 1/1915 | Harnden ......................... 47/16 |
| 1,303,827 | A | * | 5/1919 | Smit ................................ 47/16 |
| 2,169,030 | A | * | 8/1939 | Robrahn ........................ 217/42 |
| 2,738,898 | A | * | 3/1956 | Lee ................................ 221/35 |
| 2,997,041 | A | * | 8/1961 | Wolske ........................ 126/191 |
| 2009/0126269 | A1 | * | 5/2009 | Wilson .................. A01G 31/00 47/62 R |
| 2011/0089797 | A1 | * | 4/2011 | Simms et al. ................ 312/326 |

* cited by examiner

*Primary Examiner* — Lisa Tsang
*Assistant Examiner* — Magdalena Topolski
(74) *Attorney, Agent, or Firm* — Patrick Reilly

(57) ABSTRACT

A modular hydroponic growth system and method for applying the system having a central nutrient solution and nutrient reservoir that feeds nutrient solution and nutrients to one or more growth modules. A wall of the growth module is adapted to be removed to allow unimpeded access along a side of the box whereby trays may be inserted and removed without raising the bottom of the tray higher than required to clear an interior bottom surface of a cultivation chamber growth module. An additional germination compartment of the growth module supports simultaneous germination of seeds while another growth compartment of a same box supports growth in a second vessel, whereby ambient light is received by plants in the second vessel. An optional light filter screen provides varying filtering of the second vessel by selectively positioning a unified screen having two or more sections of varying strengths of light.

21 Claims, 25 Drawing Sheets

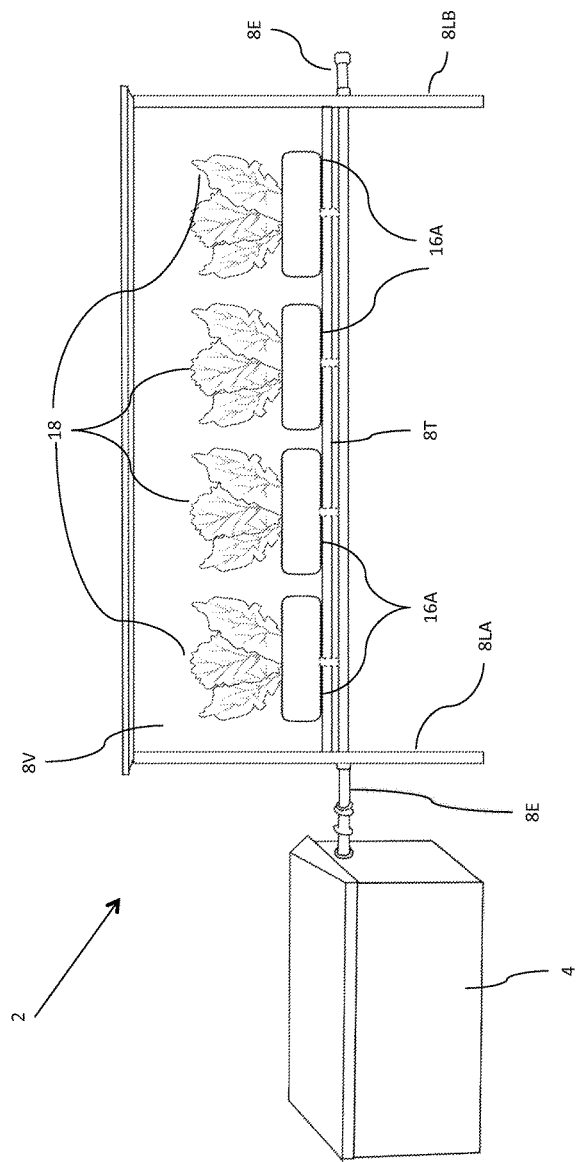

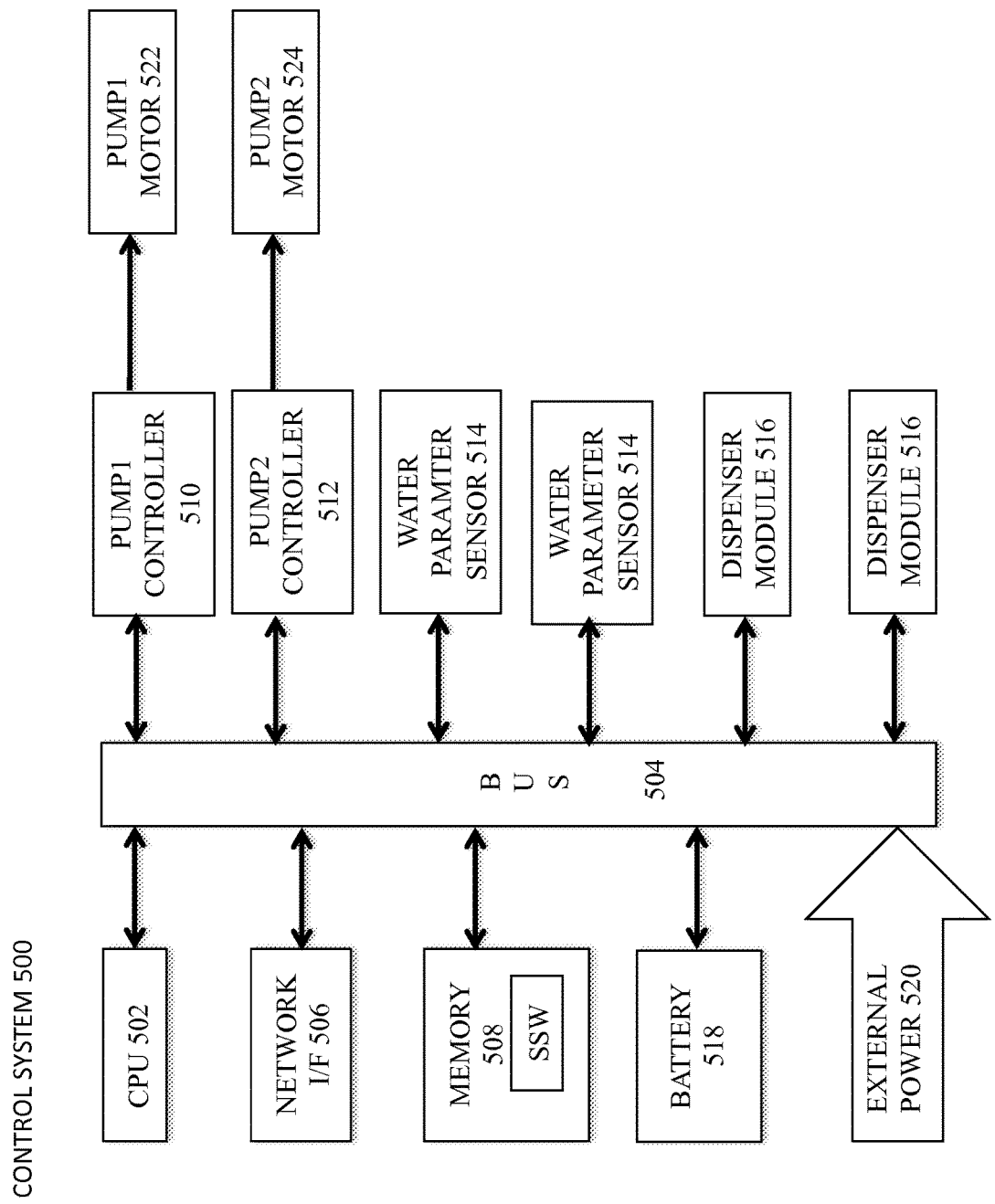

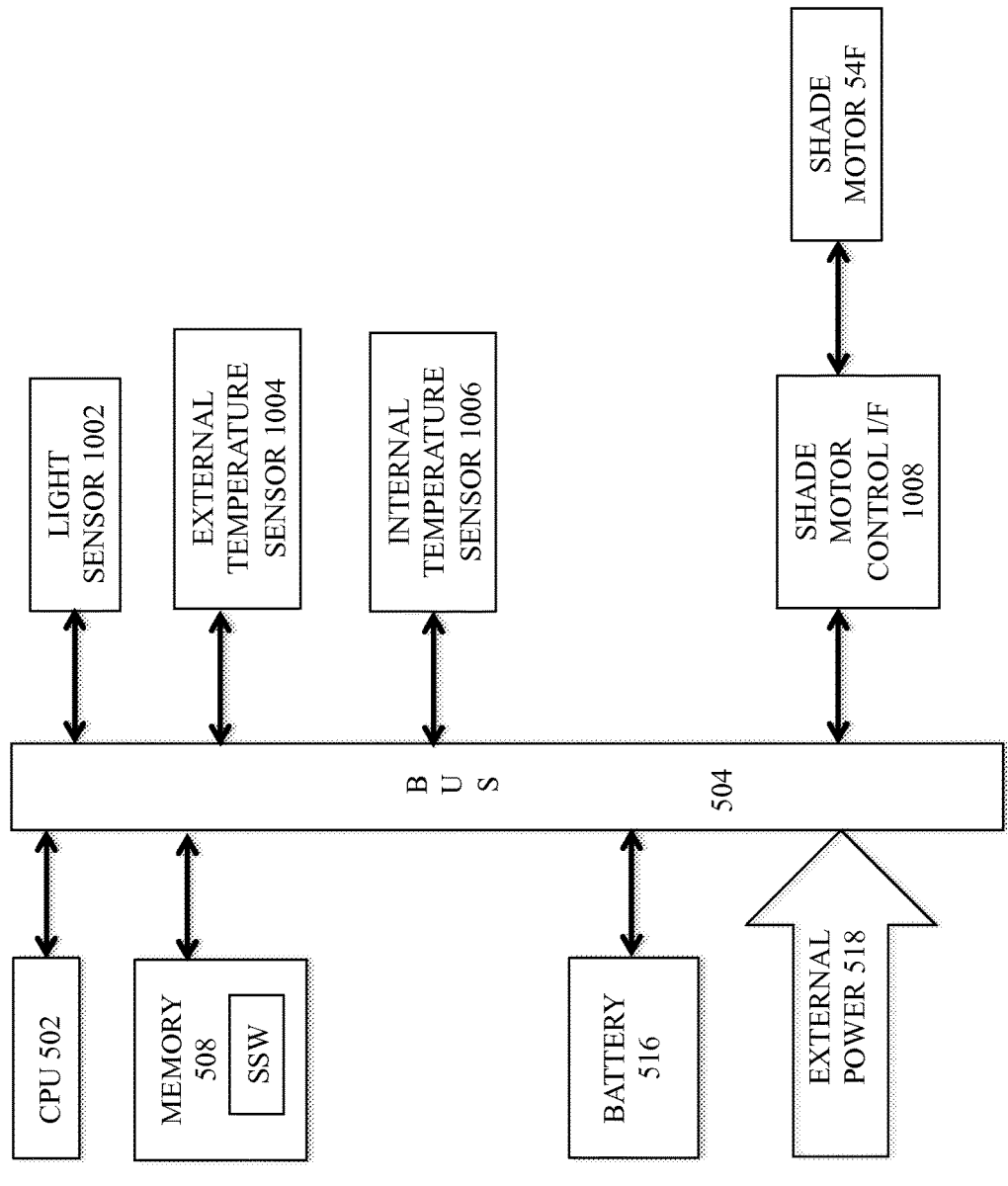

CONFIGURABLE MODULAR HYDROPONICS SYSTEM AND METHOD

FIELD OF THE INVENTION

The present invention generally relates to hydroponic farming and more particularly to systems and method of improved design of modular hydroponic systems.

BACKGROUND OF THE INVENTION

The subject matter presented in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is generally an advantage in the field of hydroponics to design and manufacture systems that can be rapidly installed in a wide variety of settings and environments while still maintaining the environmental control attributes associated with greenhouse cultivation. Hydroponic systems that can be expanded or reduced in scope as desired by a farmer or owner also generally offer benefits to many users. In addition, the capability of an installed system to be reconfigured to accommodate and best foster the growth of a wide variety of plant species is also advantageous. Furthermore, hydroponic structures that present improved ergonomic designs that reduce worker fatigue and likelihood of injury are also desirable.

There is therefore a long felt need to provide a modular hydroponics system, and method of use thereof, that may be installed in a wide variety of settings, that provides improved ergonomic design and enables adjustment and operational variance to meet the different needs of various plants.

SUMMARY AND OBJECTS OF THE INVENTION

Toward these and other objects that are made obvious in light of the present disclosure, a method and system are provided that enable a modular deployment of an invented hydroponics system and variable aspects of configuration and operation of the invented hydroponic system after an initial installation.

It is an object of the present invention to provide a modular hydroponics system that includes a nutrient solution reservoir and at least one plant growth area. An optional additional volume may be provided for the germination of seedlings that may be sponsored contemporaneously with the growth of plants in a vegetative state in the at least one plant growth area.

It is another optional aspect of the method of the present invention (hereinafter, "invented method") to provide a growth module that shelters growing plants while enabling a routine repositioning of at least one wall to enable unimpeded interior access between the remaining walls to an internal bottom wall of the growth module, whereby a worker may pull and push a plant vessel in and out of the growth module along a top horizontal loading plane of a top surface of the internal bottom wall without having to raise a bottom of the vessel substantively above the top horizontal loading plane of the bottom wall.

It is yet another optional aspect of the invented method to provide a light filtering screen having variable filtering strength sections within a substantively continuous sheet of material, or coupled to form a unified length of material. The various sections of the light filtering screen are varied in position relative to the at least one plant growth area from a rolled up position and to a filtering position, whereby the degree of shading plants within the box may be varied according to the deployment of the invented system.

The present invention further optionally provides a fluid distribution manifold integrated into each growth module. Each manifold preferably includes at least two ports and quick disconnect fittings at each port. When the fluid distribution manifolds of one or a plurality of growth modules are coupled to a nutrient solution reservoir containing a level adjusting pump unit of the invented system, said pump unit provides the ability to set and adjust the amount of nutrient solution introduced to cultivation vessels coupled to distribution manifolds serviced by said level adjusting pump unit.

The present invention additionally optionally provides an environmental control system, adapted for inducing ventilation inside the cultivation chamber with fan modules and the ability to mechanically actuate the upper door panel. Both outlet and inlet louvers may be arranged to cover ventilation apertures of the growth module when the fans are not in use via a mechanical or passive method. Screens and filters over ventilation apertures may also be included to prevent pests from contaminating the growth module.

The present invention optionally provides an apparatus for heating and cooling the growth module and nutrient solution. Heating of the invented system can be achieved alternatively through electric radiant heating pads or hydroponic heat exchangers and/or forced hot air supplied by an external heat source The invented method optionally additionally provides a means for adjusting the transparency of the top surface of the growth module.

The present invention optionally provides one or more detachable connections to power lines, electronic communications networks, and distribution manifolds to enable direct or indirect coupling of a plurality of growth modules to a single nutrient solution reservoir thereby creating numerous cluster configuration options.

The present invention optionally further enables automated environmental monitoring apparatus, such as sensors for sensing environmental conditions internal to the cultivation section, internal to the nutrient solution reservoir, and ambient external conditions.

The present invention may optionally include a hydroponic cultivation vessel, such as a tray or other suitable vessel known in the art. The hydroponic cultivation vessel may have multiple adaptations and configurations to support growth of a variety of plant cultivars and may further be coupled to the distribution manifold to permit the periodic flow of nutrient solution into the cultivation vessel.

The present invention also provides a growth module that can be rapidly reconfigured by adding and removing various modular parts such as intervening panel sections, corner post spacers, and trellis sections whereby cultivation chamber can be altered spatially to support variety of crops through seasonal transitions or in response to shifts in consumer demand.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The invention is pointed out with particularity in the appended claims. The advantages of this invention described above, and further advantages, may be better understood by reference to the following description taken in conjunction with the accompanying drawings, in which:

FIG. 1B is a front view of the invented modular hydroponics system of FIG. 1A with the front access door removed and exposing a plurality of cultivation vessels and plants;

FIG. 5A is a schematic drawing of elements of an electrical control and power system of the invented modular hydroponics system of FIG. 1A that are related to the reservoir operations;

FIGS. 10A through 10D present aspects of an optional and invented shade system that can be attached to the growth module of FIG. 1A;

DETAILED DESCRIPTION

It is to be understood that the present invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1A:
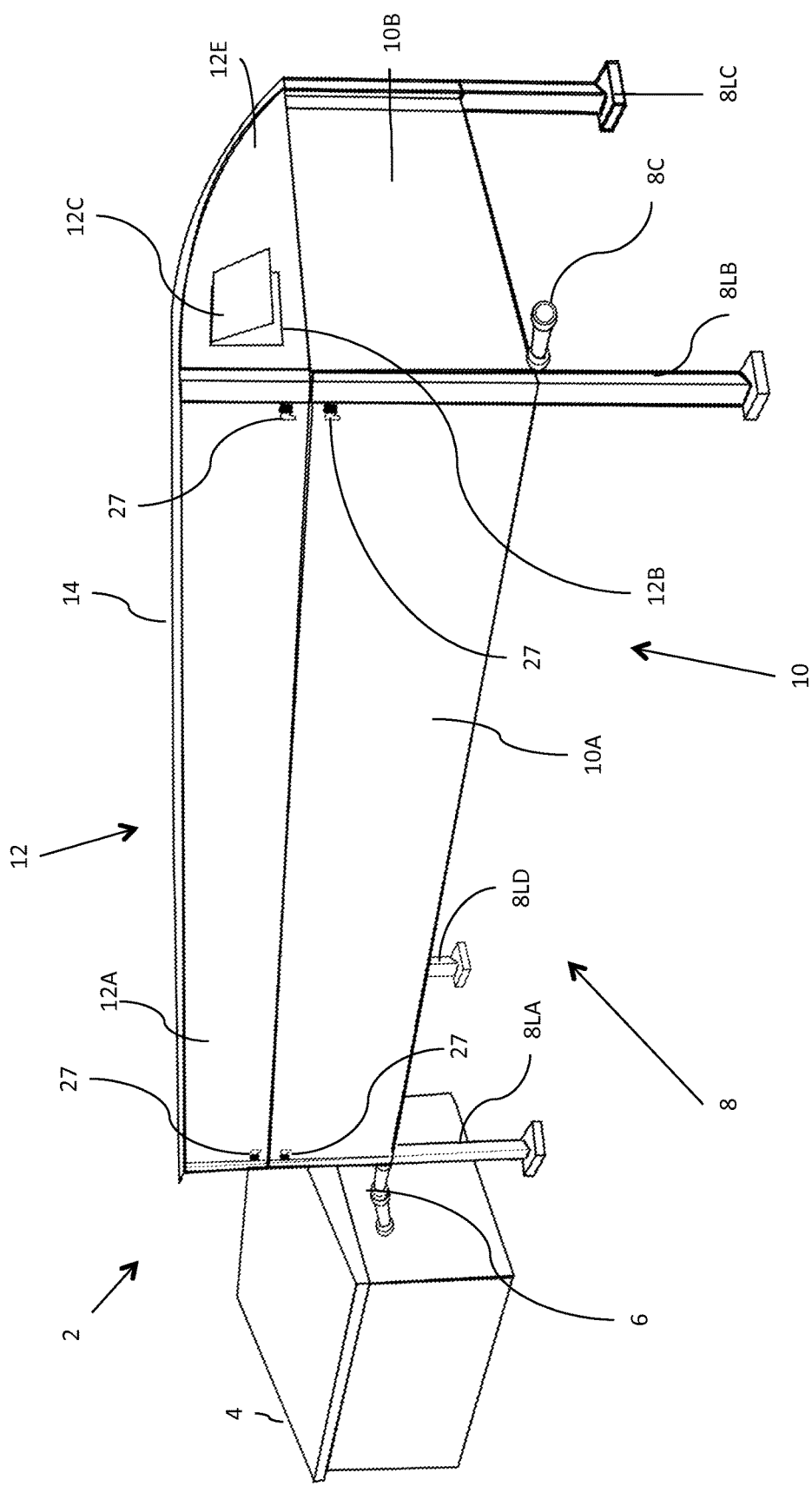
FIG. 1A is a perspective view of an invented modular hydroponics system that includes a nutrient solution reservoir and a growth module.
Figure 3:
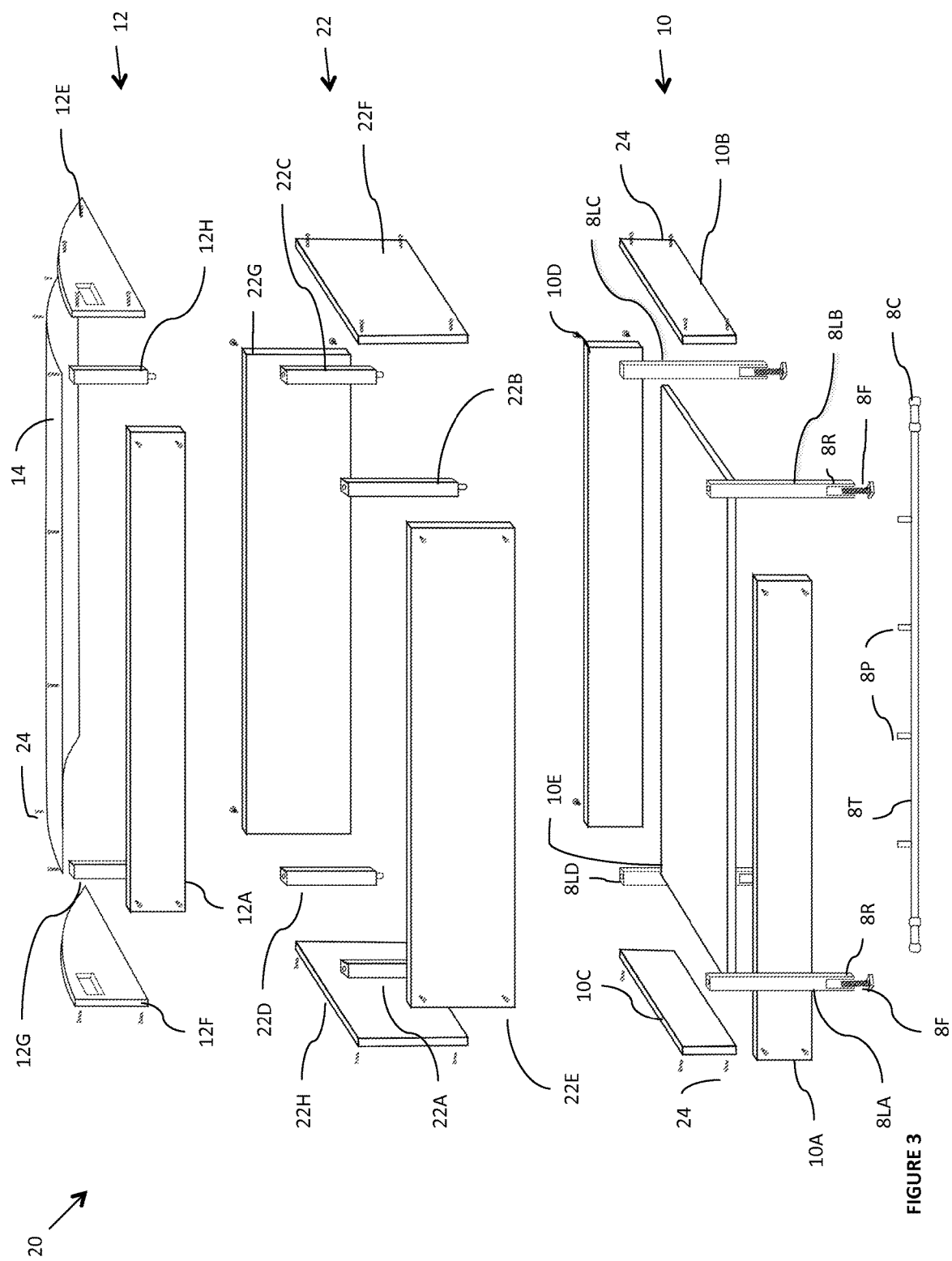
FIG. 3 is an exploded view of the growth module of FIG. 1A and including an additional intervening section.

FIG. 1A is a perspective view of an invented modular hydroponics system 2 (hereinafter, "first invented system" 2) presented in a first, or closed, position. The invented system 2 includes a nutrient solution reservoir 4, a connective tubing 6 and a growth module 8. The modular growth module 8 defines a first interior volume 8V, as presented in FIG. 4B, and includes four metallic legs 8LA-8LD, a distribution manifold 8T as shown in FIG. 1B, a tubing cap 8C, a cultivation section 10, an upper section 12 and a lid 14. The four legs 8LA-8LD are preferably telescoping or otherwise adjustable in length. The cultivation section 10 includes a front access door 10A, two cultivation sidewalls 10B & 10C, a cultivation back wall 10D and a bottom wall 10E, as shown in FIG. 3.

Figure 4A:
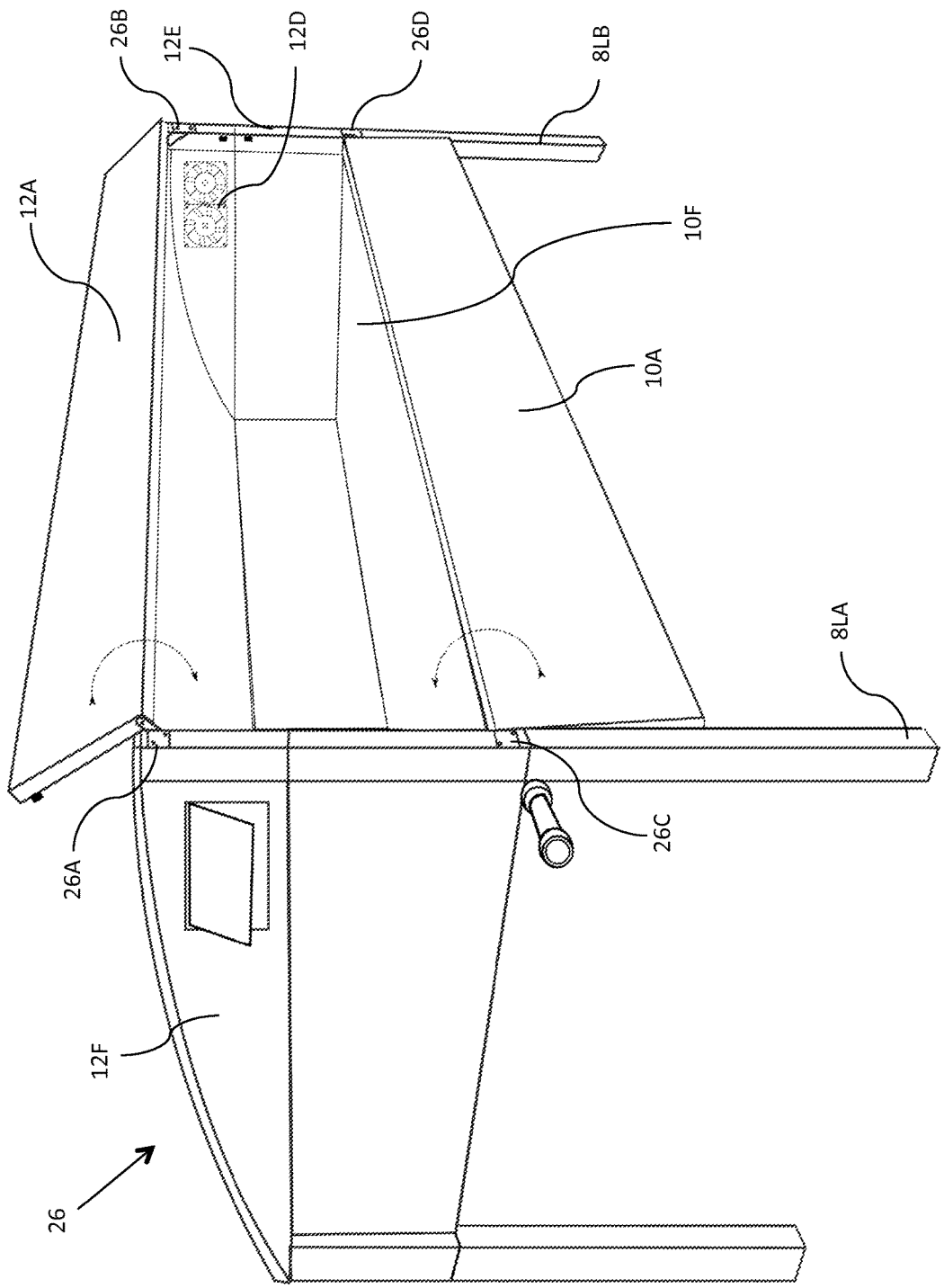
FIG. 4A is a perspective view of a third alternate embodiment of the invented system that presents two hinged access doors in an open position.

The upper section 12 includes an upper access wall 12A and preferably generally allows ambient light to enter into the first interior volume 8V. A ventilation aperture 12B may include an optional ventilation louver 12C that can be operated passively or mechanically. The ventilation aperture 12B optionally further accepts a motorized fan module 12D, as shown in FIG. 4A. The lid 14 is coupled with the upper section 12 at upper sides 12E & 12F and preferably is designed, built and positioned to effectively shield the first interior volume 8V from wind and rain and form an insulated or closed mass for improved heating and/or cooling.

The growth module 8 may further include LED or fluorescent lighting apparatus that generates artificial light inside the growth module 8 through both top and sidewall placement.

The growth module 8 cultivation section 10 may be constructed with flat insulated laminate panel with insulating core, e.g. foam, honeycomb, and the like, encased in or covered in a metal or plastic skin, whereby the growth modules 10 can be disassembled and "flat packed" for shipping. The cultivation section 10 may alternatively be constructed as a single molded composite or plastic piece. Variations in wall thickness for insulating needs can be incorporated in the growth module 8 construction. The growth module 8 can also be non-insulated and made out of any suitable sheet-like material known in the art.

The upper section 12 may be formed of or comprise corrugated polycarbonate panel options, or other suitable material options known in the art. Multiple alternative shapes of the lid 14 may consist of a curved roof, a flat-pitched roof, a peaked roof and other suitable shapes known in the art.

FIG. 1B is a front view of the first invented system 2 in a second open position with the front access door 10A and the upper access wall 12A are removed, whereby easy access to the first interior volume 8V by workers is enabled. Four removable first-size trays 16A rest inside the growth module 8 and directly on a top side of the bottom wall 10E of the cultivation section 10. Each first-size tray 16A is separately and detachably coupled with an individual internal ports 8P of the distribution manifold 8T to periodically receive nutrient solution from the nutrient solution reservoir 4. The distribution manifold 8T also contains external ports 8E at the longitudinal extremities of the growth module 8 whereby the distribution manifold 8T can be coupled to a nutrient solution reservoir 4 and/or another growth module 8. One or more cabbage plants 18 are positioned within the growth module 8 and within the first-size trays 16A.

Figures 2A, 2B, 2C:
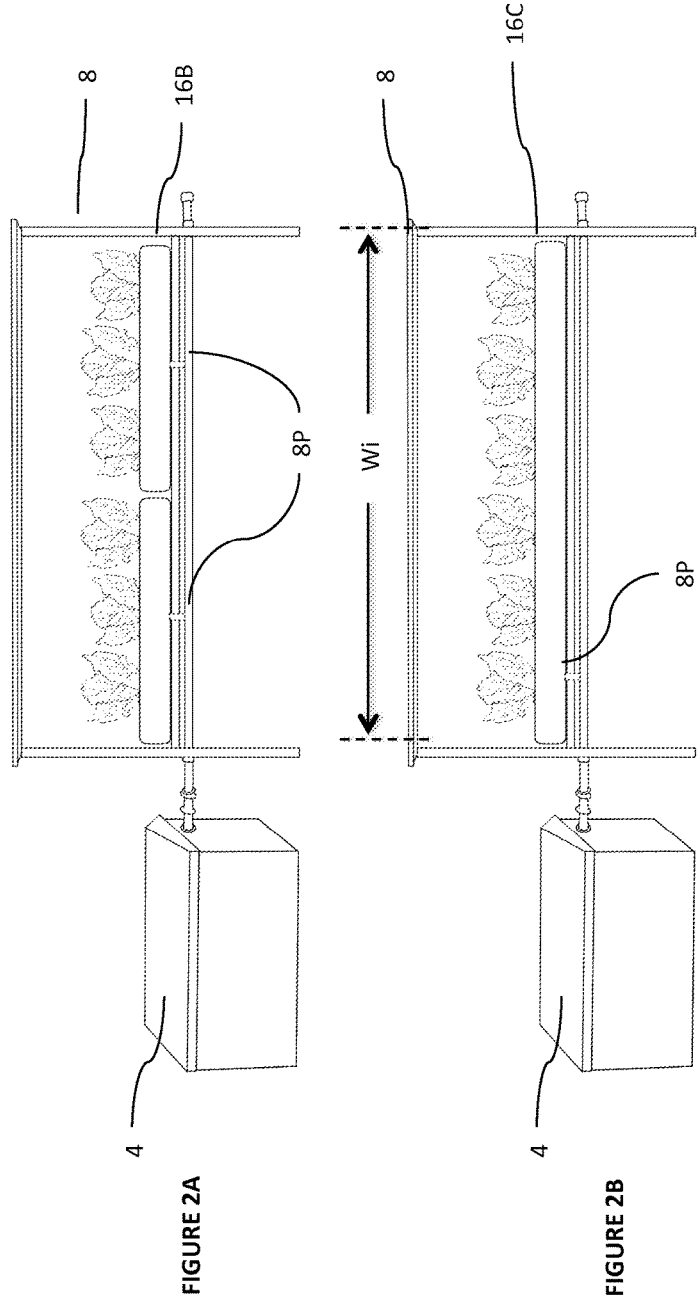
FIGS. 2A through 2C are front views of different growth cultivation vessel configurations placed within the growth module of FIG. 1A and FIG. 1B.

FIGS. 2A through 2C are separate front views of three differently shaped cultivation vessels 16B-16D, i.e., growth trays 16B & 16C and growth pots 16D, that are individually insertable into the growth module 8. As shown in FIG. 2A, each of two second-size trays 16B are adapted to be simultaneously fit within the growth module 8, wherein each of the two placed second-size trays 16B are detachably coupled with a single internal port 8P. As shown in FIG. 2B a third-size tray 16C is shaped to nearly fill the interior width Wi of the growth module 8. The third-size tray 16C is detachably coupled with a single internal port 8P. FIG. 2C presents a pots 16D that are coupled to one or more internal ports 8P.

FIG. 3 is an exploded view of a second preferred embodiment of the present invention 20 (hereinafter, "second system" 20). The second system 20 includes the cultivation section 10, the upper section 12, the lid 14 and an intervening section 22. Intervening metal spacers 22A-22D are adapted for insertion into both a leg 8LA-8LD and individual upper posts 12G & 12H of the upper assembly 12. Four intervening walls 22E-22H are mechanically or magnetically fastened to the metal spacers 22A-22D, whereby the interior volume 8V of the growth module 8 can be expanded vertically with the placement of successive intervening sections.

The front access door 10A and cultivation walls 10B, 10C & 10D, in addition to mechanical fasteners 24, may also present magnets that provide sufficient magnetic force to maintain each intervening walls 22D-22G statically in place with the metallic legs 8LA-8LD. Each leg 8LA-8LD forms and presents a tapped receiver 8R that accepts and engages with a threaded foot feature 8F, wherein the height of the growth module 8 can be adjusted by rotating the threaded foot features 8F within the tapped receivers 8R.

The distribution manifold 8T may be made of rigid polyvinyl chloride or other suitable material known in the art.

Referring now to FIG. 4A, a third preferred embodiment of the present invention (hereinafter, "third system" 26) includes hinges 26A-26D, wherein an upper pair of hinges 26A & 26B rotatably couple the upper access wall 12A to the upper side walls 12 E & 12F, and a lower pair of hinges 26C & 26D rotatably couple the front access door 10A to the front legs 8LA & 8LB. The hinge pairs 26A-26B & 26C-26D enable the upper access door 12A and the front access door 10A to rotatably transition from the first, closed position of FIG. 4B to a second, open, position of FIG. 4A. In the open position, the front access door 10A is positioned fully below the top surface 10F of the bottom wall 10E. Latches 27 detcahably secure the front access door 10A in a vertical orientation extending from the lower pair of hinges 26C & 26D.

Figure 4B:
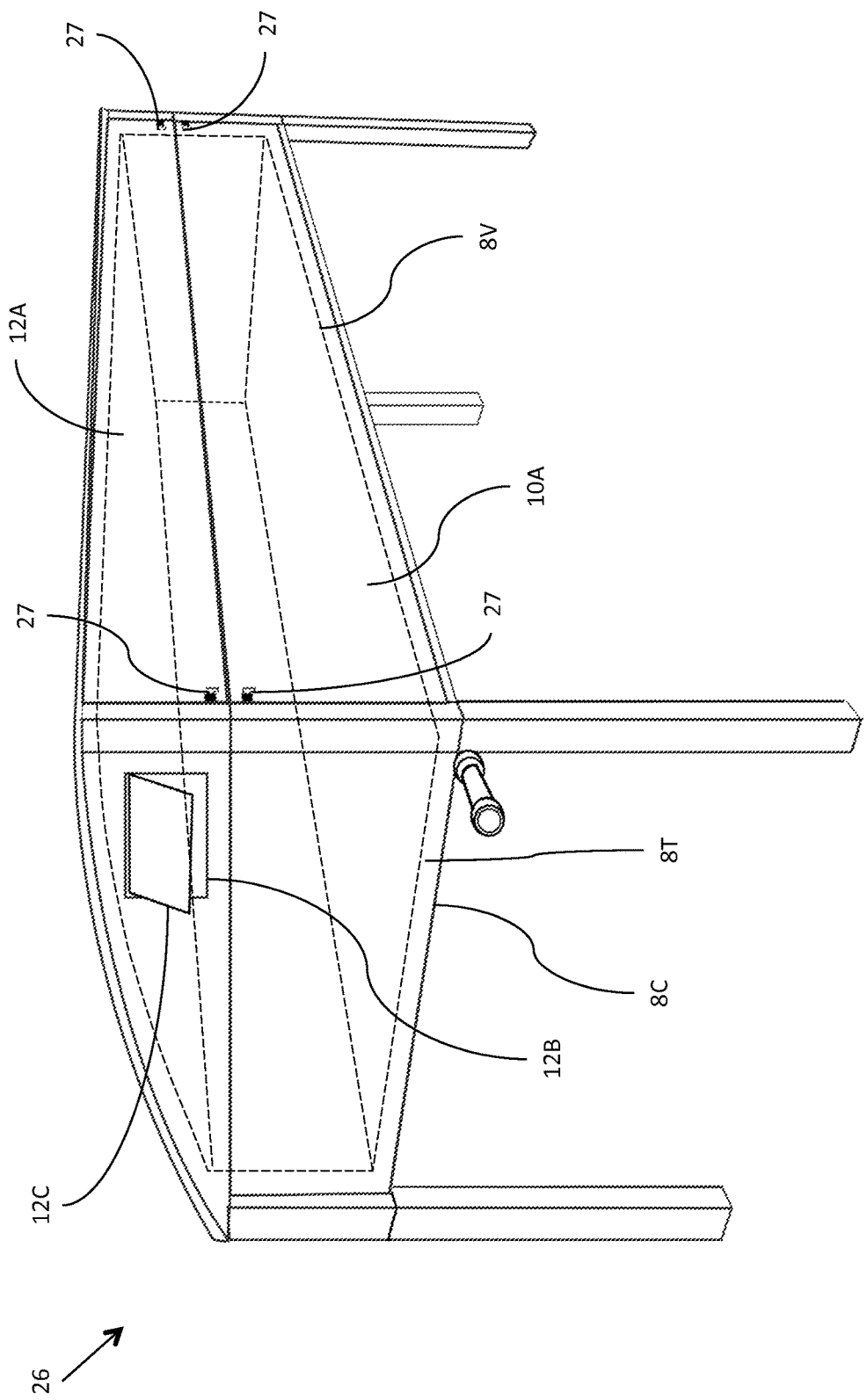
FIG. 4B is a perspective view of the third alternate embodiment of the invented system that presents two hinged access doors in a closed position.

Referring now to FIG. 4B, the third system 26 is placed into a closed position to define the interior volume 8V and thereby protects the exemplary plants 18. The interior volume 8V of the growth module 8 is illustrated by dashed lines in FIG. 4B.

Figure 4C:
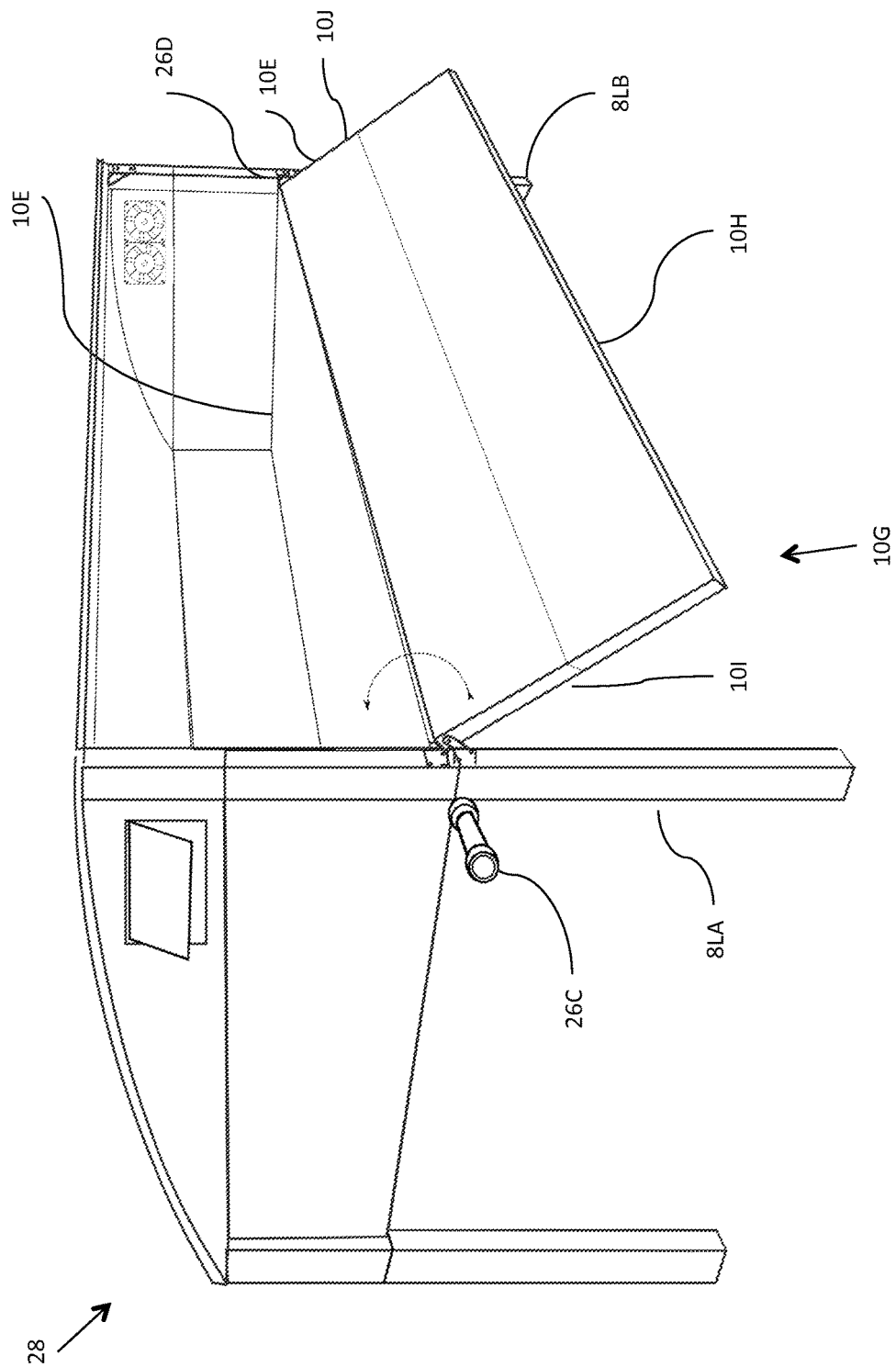
FIG. 4C is a perspective view of a fourth alternate embodiment of the invented system that presents an access door assembly in an open position.

Referring now to FIG. 4C, a fourth preferred embodiment of the present invention (hereinafter, "fourth system" 28) that includes an alternate front access door assembly 10G that includes a framed opaque panel 10I and a substantively translucent framed panel 10H presented in an open position. The framed opaque panel 10I and the translucent framed panel 10H are joined together by fasteners 24 and form a pressure sealed seam 10J. The lower pair of hinges 26C & 26D rotatably attach the alternate front access door assembly 10G to the front legs 8LA & LB respectively. In this second, open position, the front access door assembly 10G is positioned fully below the top surface 10F of the bottom wall 10E of the cultivation section 10.

Figure 4D:
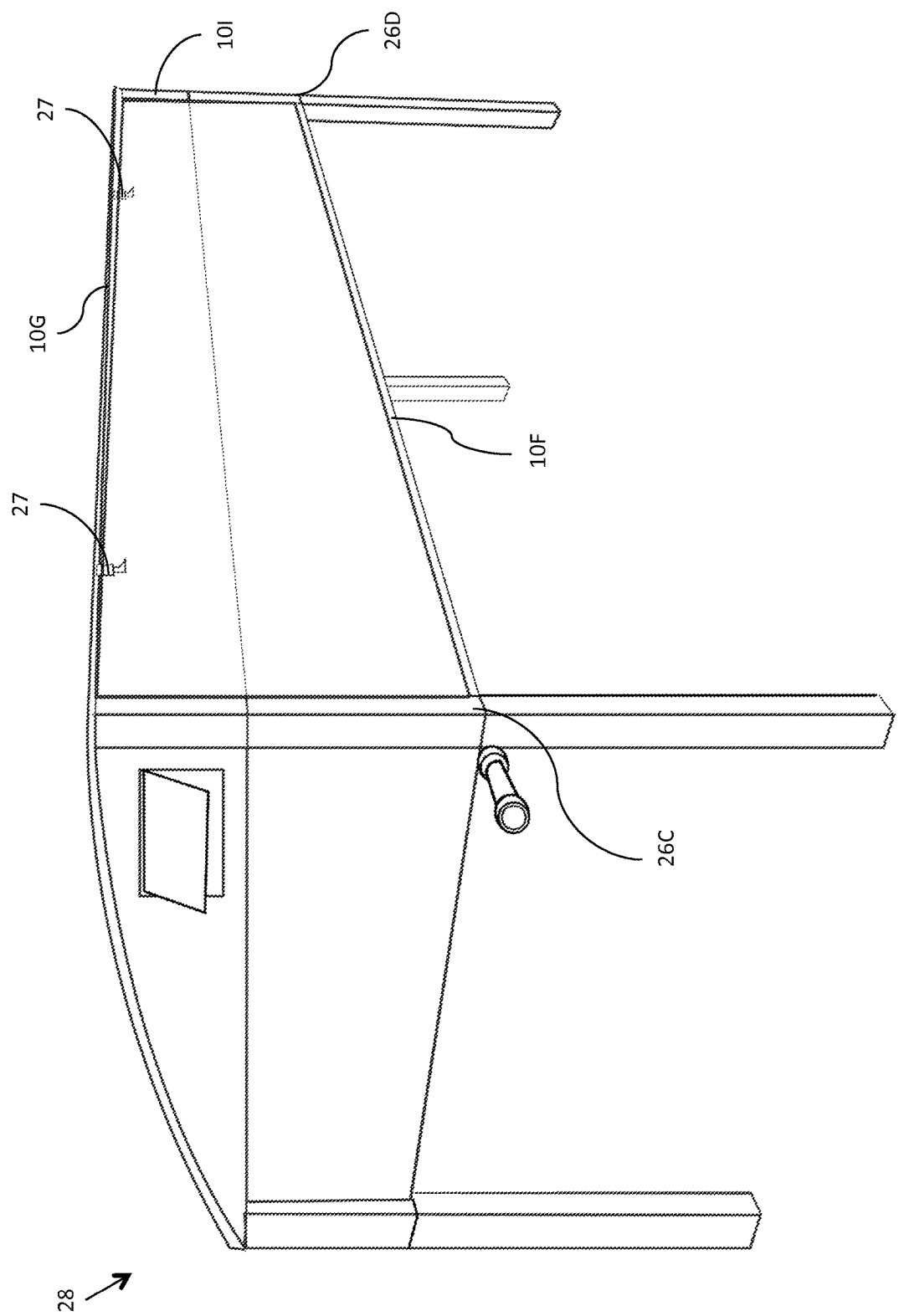
FIG. 4D is a perspective view of the fourth alternate embodiment of the invented system of FIG. 4C with an access door in a closed position.

Referring now to FIG. 4D, the fourth system 28 is shown in a closed position wherein the additional height provided by the translucent framed panel 10H enables the alternate front access door assembly 10G to extend in height from the bottom wall 10E and to the lid 14 and thereby enclose the exemplary plants 18 in the interior volume 8V.

Figure 4E:
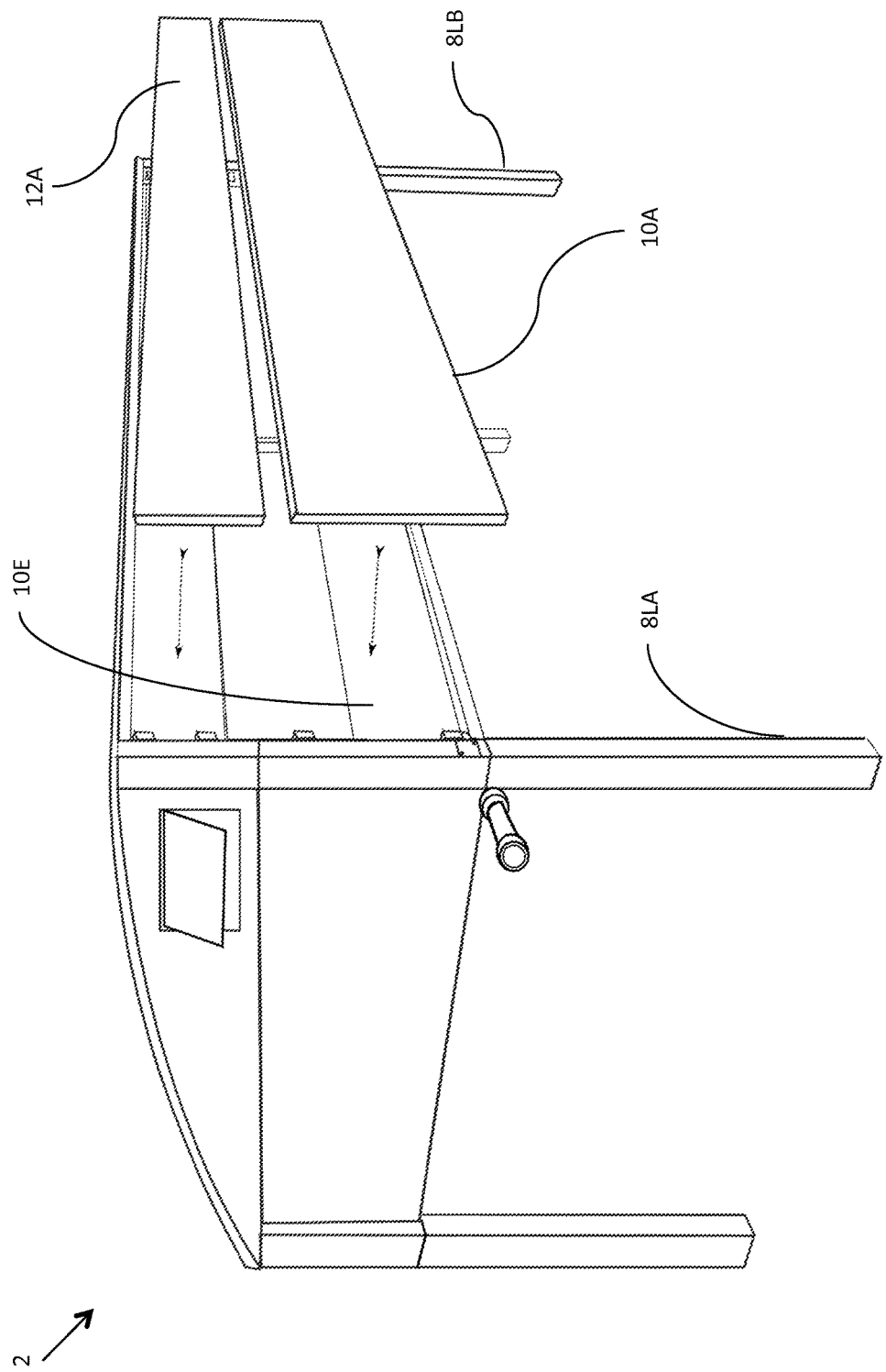
FIG. 4E is a perspective view of the invented modular hydroponics system of FIG. 1A.

Referring now to FIG. 4E, the first system 2 is shown transitioning from the first closed position of FIG. 1A to the first open position of FIGS. 1B and 2A-2C, wherein the front access door 10A and the upper access door 12A are removed from coupling with the additional walls of the growth module 8.

Figure 4F:
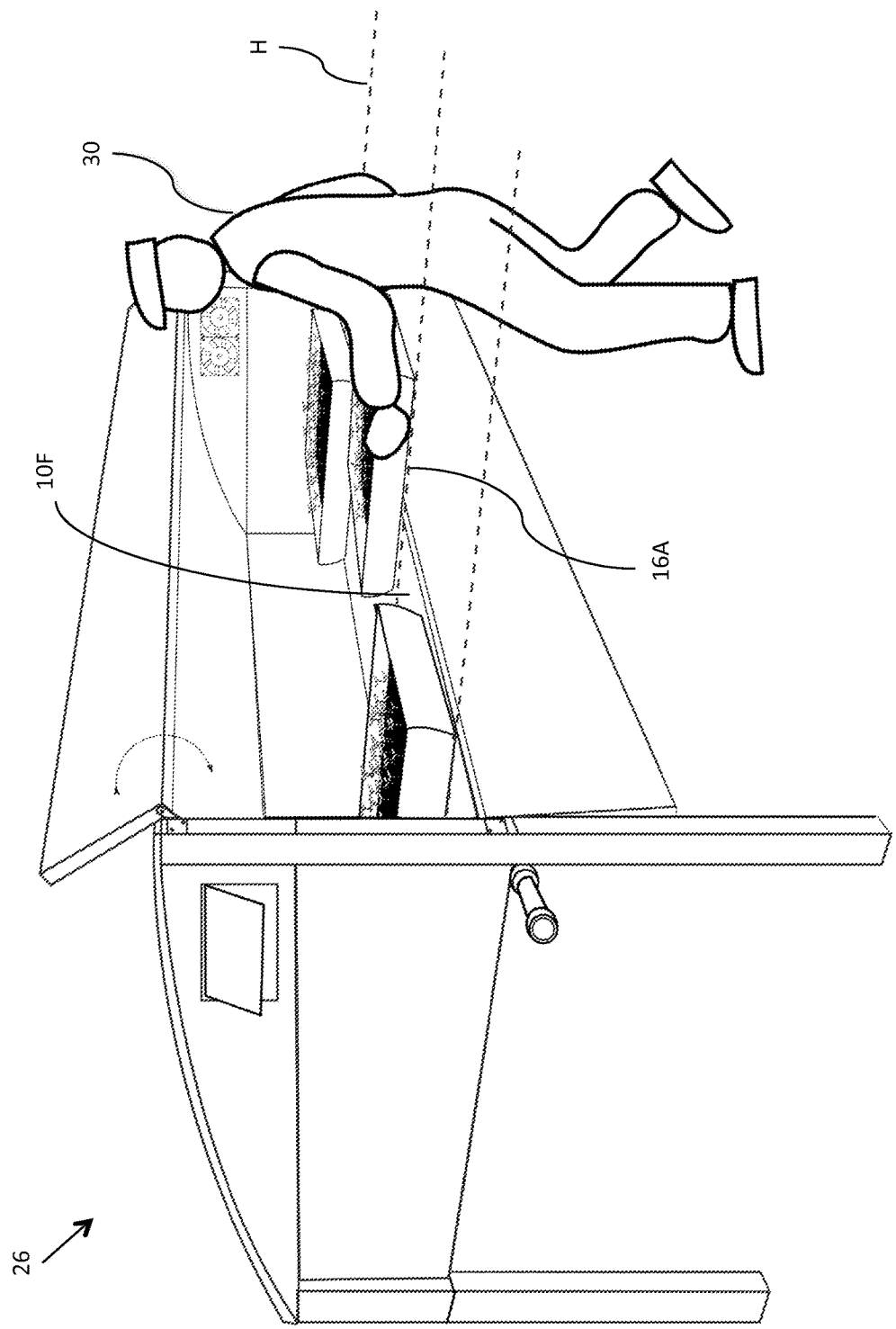
FIG. 4F is a perspective view of a worker placing a tray into the third alternate embodiment of the invented system of FIG. 4A.

Referring now to FIG. 4F, FIG. 4F presents a worker 30 inserting a first-size tray 16A onto the top surface 10F of the bottom wall 10E of the third system 26, wherein the upper access wall 12A is swung downward and completely below a horizontal loading plane H that extends from a topside 10F of the bottom wall 10E. This mobility of the lower access wall 10A into a position fully below the horizontal loading plane H permits the worker 3 to insert and remove cultivation vessels 16A-16D without the worker 30 having to lift the trays 16A-16C or pots 16D higher than necessary to clear the horizontal loading plane H, whereby both the likelihood of work place injury and the physical strain placed on the worker 30 in lifting and lowering trays 16A-16C and pots 16D is reduced.

Referring now to FIG. 5A, FIG. 5A is a schematic of elements of a control system 500 of the invented system 2 that manage certain operations of the reservoir 4, wherein a central processing unit 502 (hereinafter, "CPU" 502) is bi-directionally communicatively coupled by a power and communications bus 504 with a plurality of modules and circuits, to include a network interface 506, a memory 508, a first pump controller 510, a second pump controller 512, one or more nutrient solution condition sensors 514 and one or more dispenser modules 516. The power and communications bus additionally accepts electrical from an external power source 520 and alternately a battery 518 and delivers energy to the elements of the control system 500 as directed by the CPU 502. A system software SSW stored in the memory 508 directs the CPU 502 to execute the aspects of the invented method as disclosed in the Figures and accompanying text. The first pump controller 510 alternately supplies power to a first motorized pump 522 as directed by the CPU 502 and the second pump controller 512 alternately supplies power to a second motorized pump 524, also as directed by the CPU 502.

Certain alternate preferred embodiments of the invented system may include multiple pumps for zone irrigation. The CPU 502 is preferably housed in a dry compartment of the reservoir 4, and the power and communications bus 504 preferably extends to enable bi-directional communication with, and delivery of electrical power to the growth module 8.

Figure 5B:
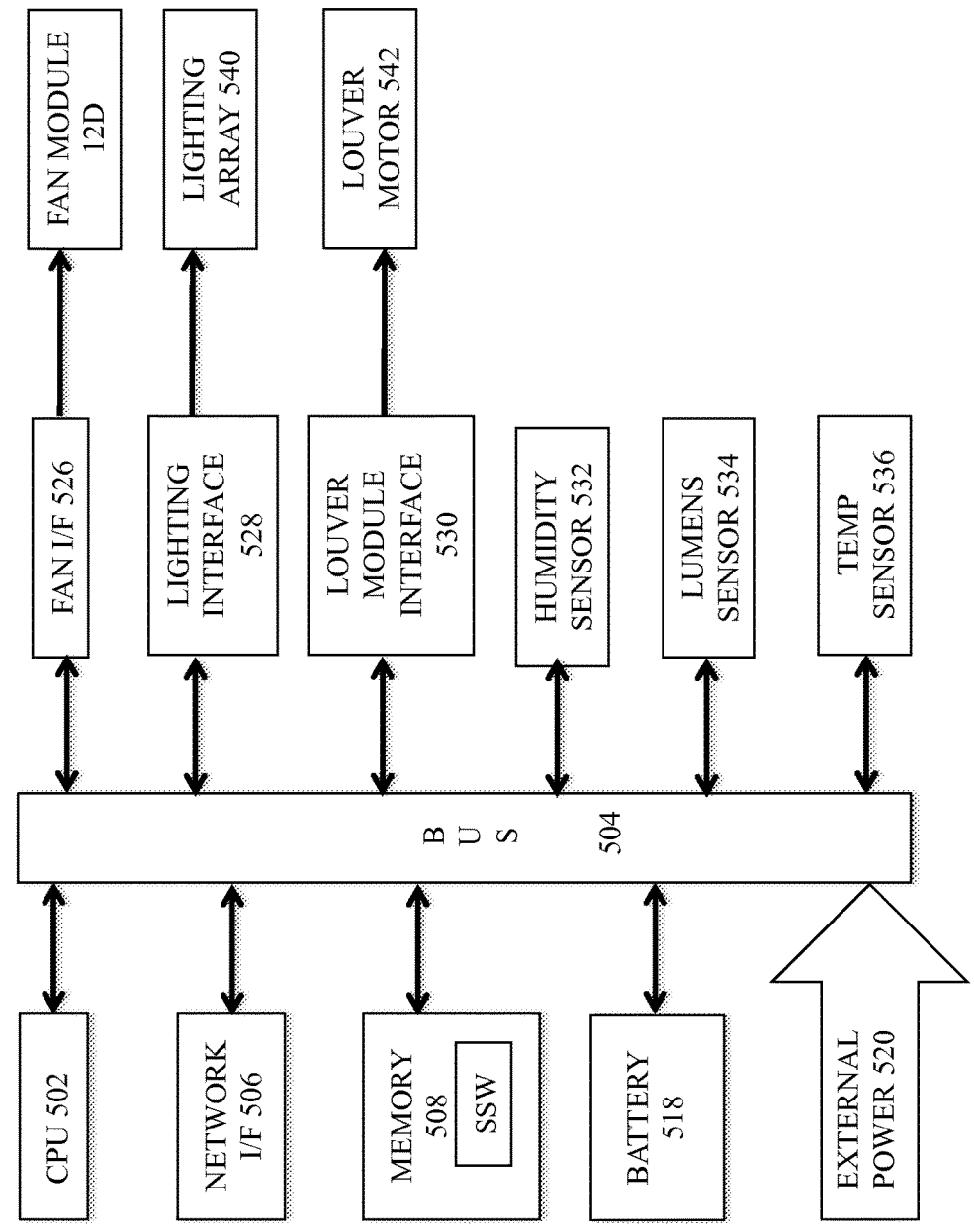
FIG. 5B is a schematic drawing of additional elements of the electrical control and power system FIG. 5A that are related to the growth module environment.

Referring now to FIG. 5B, FIG. 5B is a schematic of additional elements of the control system 500 that relate to the internal environment of the growth module 8. The CPU 502 is bi-directionally communicatively coupled by the power and communications bus 504 with a plurality of modules and circuits, to include a network interface 506, a memory 508, a fan module interface 526, a lighting array interface 528, a louver module interface 530, a humidity sensor 532, a lumens sensor 534, and a temperature sensor 536. The power and communications bus 504 additionally accepts electrical from the external power source 520 and alternately the battery 518 and delivers energy to the fan module interface 526, the lighting array interface 528 and the louver module interface 530 as directed by the CPU 502.

The fan module interface 526 alternately delivers electrical power to the motorized fan unit 12D as directed by the CPU 502; the lighting array interface 528 alternately delivers electrical power to a lighting array 540 positioned within the growth module 8; and the louver module interface 530 alternately delivers electrical power to a louver motor 542.

Figure 6A:
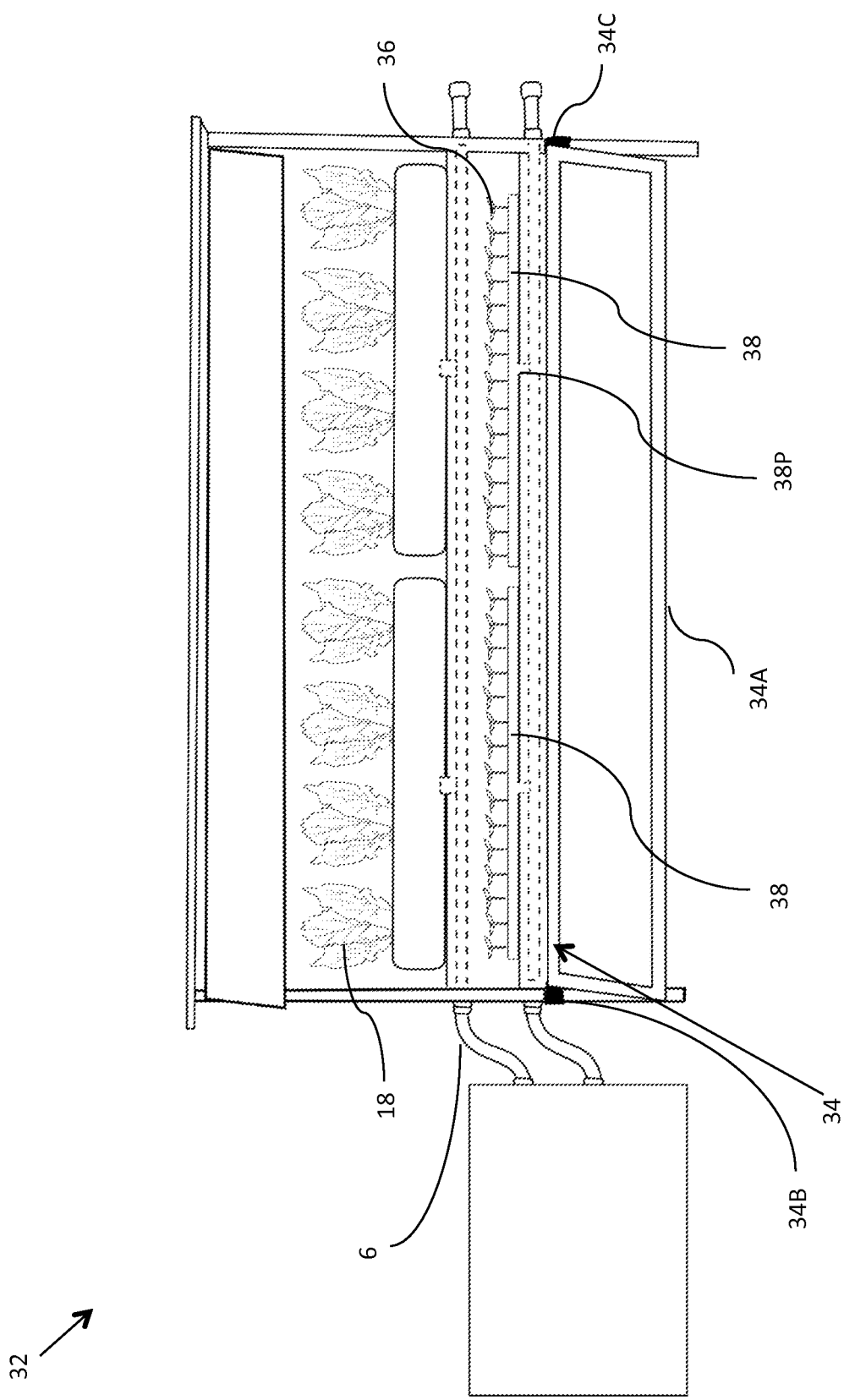
FIG. 6A is a perspective view of the invented modular hydroponics system of FIG. 1A with an additional germination chamber and comprising two level adjusting pump units.

Referring now to FIG. 6A, a sixth preferred embodiment of the present invention (hereinafter, "sixth system" 32) further comprises a germination box 34, wherein a plurality of seeds 36 are positioned in germinations trays 38 within the germination box 34. A germination box access door 34A is rotatably coupled with the sixth system 32 by germination box hinges 34B & 34C and enables worker access to a second interior volume of the sixth system 32. It is understood that it is preferable that the germination box 34 fully encloses the germinations trays 38 when the germination access door 36 is rotated fully upward into a vertical first position in order to best to inhibit ambient light from extending into the interior volume to induce conditions best suited for seed germination. It is further understood that positioning the germination box 34 under the cultivation box 10 is also preferred in order to enable exposure of the plants 18 to light energy while better shielding the seeds 36 from exposure to light sources.

Figure 6B:
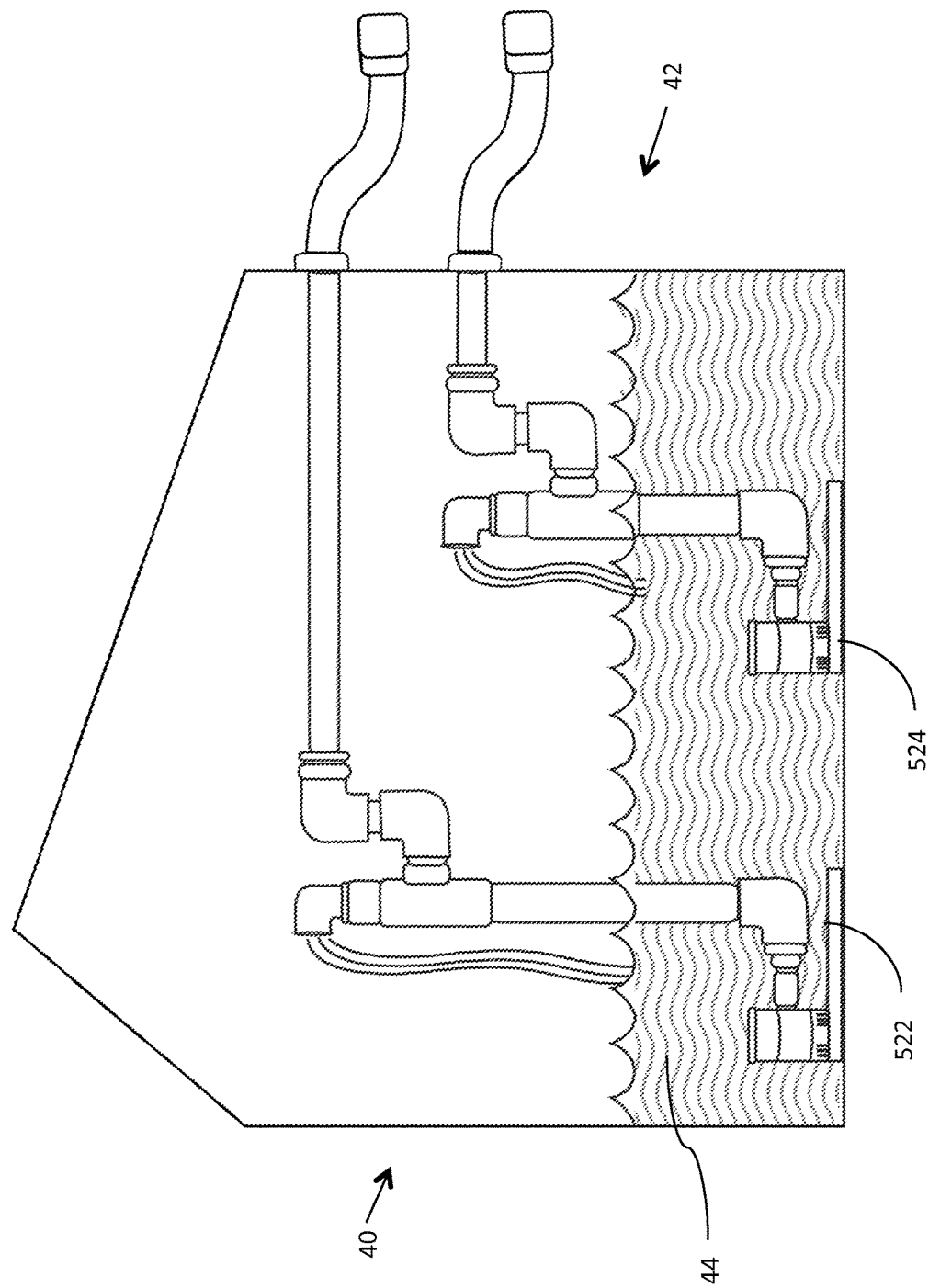
FIG. 6B is a detailed view of two level adjusting pump units within a nutrient solution volume of the nutrient solution reservoir of FIG. 1A.

Referring now to FIG. 6B, two level adjusting pump units 40 & 42 of the sixth system 32 are presented. A first level adjusting pump unit 40 includes the first pump 522 and is coupled to the distribution manifold 8T of the growth module 8. A second level adjusting pump unit 42 includes the second pump 524 and is coupled to a germination distribution manifold 34T Each germination tray 38 is detachably coupled to an internal germination port 38P of the germination distribution manifold 38T. The first level adjusting pump unit 40 pumps nutrient solution 44 into the distribution manifold 38T as directed by the CPU 502 to provide nutrient solution into the cultivation vessels 16A-16D inserted into the growth module 10 and coupled to an internal port 8P of the distribution manifold 8T. The second level adjusting pump unit 42 pumps nutrient solution 44 into germination distribution manifold 38T as directed by the CPU 502 to provide nutrient solution into the coupled germination tubing port 38P of the germination distribution manifold 34T. It is preferable a first elevation flood level established by the first level adjusting pump unit 40 within the cultivation chamber 10 be higher vertically than a second elevation flood level established by the second level adjusting pump unit 42 within the within the germination box 34 to insure that the higher placed plants 18 growing within the cultivation section 10 receive a sufficient nutrient solution supply sourced from the reservoir.

Figure 6C:
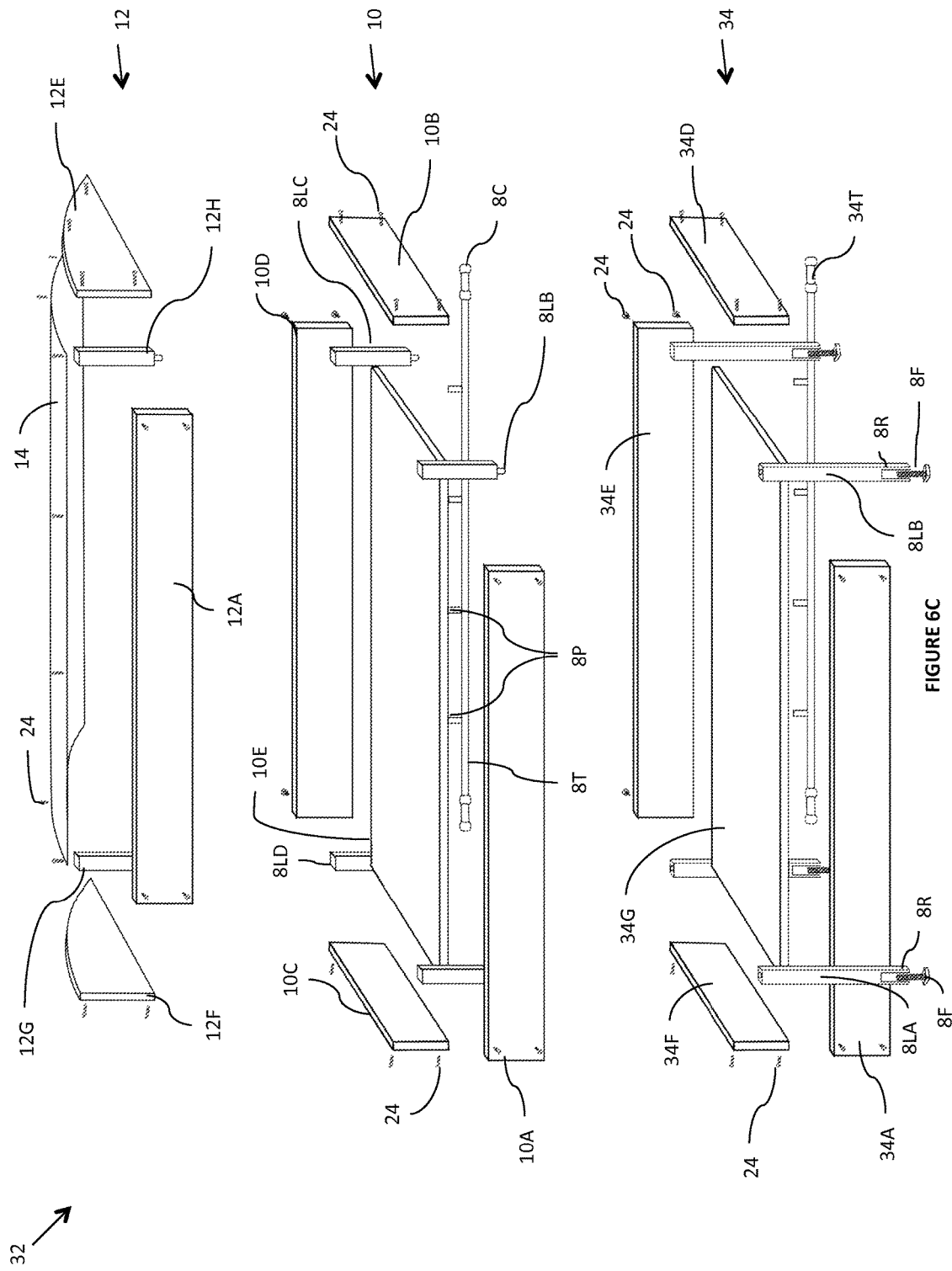
FIG. 6C is an exploded view of the growth module of FIG. 6A

FIG. 6C is an exploded view of the sixth system 32, wherein the legs 8LA-8LD, the cultivation section 10 and the upper section 12 of the first system 2 are included and in addition the germination box 34 is shown to comprise the germination access door 34A and a plurality of germination box walls 34D-34G. The plurality of germination box walls 34D-34G are closely coupled together and with the cultivation section bottom wall 10E by means of fasteners 24. The coupling of the germination box access door 34A by means of the germination box hinges 34B & 34C to the plurality of germination walls 34D-34G and the coupling of the germination box 34 with the cultivation bottom wall 10E and the cultivation section legs 8LA-8LD preferably limit unintended intrusion of light into the germination box 34 and upon the seeds 36, as seeds are generally best sprouted in darkness.

Figure 7A:
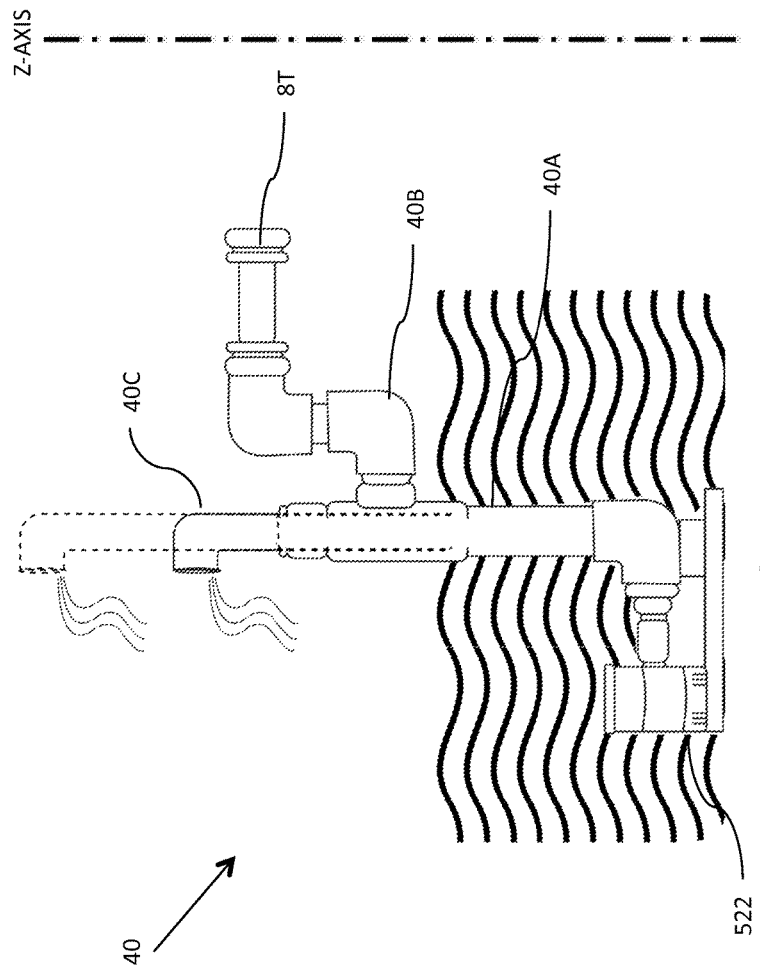
FIG. 7A is a detailed assembly of a level adjusting pump unit of the invented modular hydroponics system of FIG. 6A.

FIG. 7A is a detailed assembly view of the level adjusting pump unit 40. The level adjusting pump unit 40 includes a motorized pump 522 coupled to a water column 40A that contains (a.) an outflow port 40B coupled with the distribution manifold 8T of the growth module 10 and (b.) an overflow drain 40C that can be manually adjusted along a vertical Z-axis.

Figure 7B:
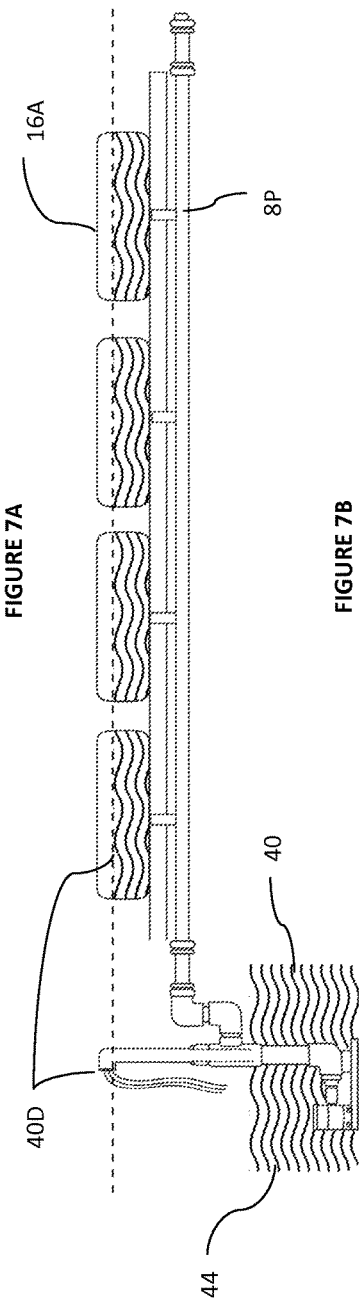
FIG. 7B is a detailed assembly of a level adjusting pump coupled to a distribution manifold and a plurality of cultivation vessels.

FIG. 7B is a detailed assembly view of the first level adjusting pump unit 40 and presenting the case where four first-size trays 16A are each detachably coupled at separate distribution manifold internal ports 8P. It is understood that each first-size tray 16A when coupled with an internal port 8P alternately (a.) receives nutrient solution 44 as pumped from the nutrient solution reservoir 4 through the coupled internal port 8P; and (b.) returns, via gravitational drainage, nutrient solution 44 through the distribution manifold 8T when the pump pressure is insufficient to maintain nutrient solution 44 in the instant first-size tray 16A, or other coupled cultivation vessel 16B-16D. When the motorized pump 522 is activated, the nutrient solution pumped into the first size trays 16A will rise to a maximum level that corresponds to the height at which the overflow drain 40C has been adjusted.

Figure 8:
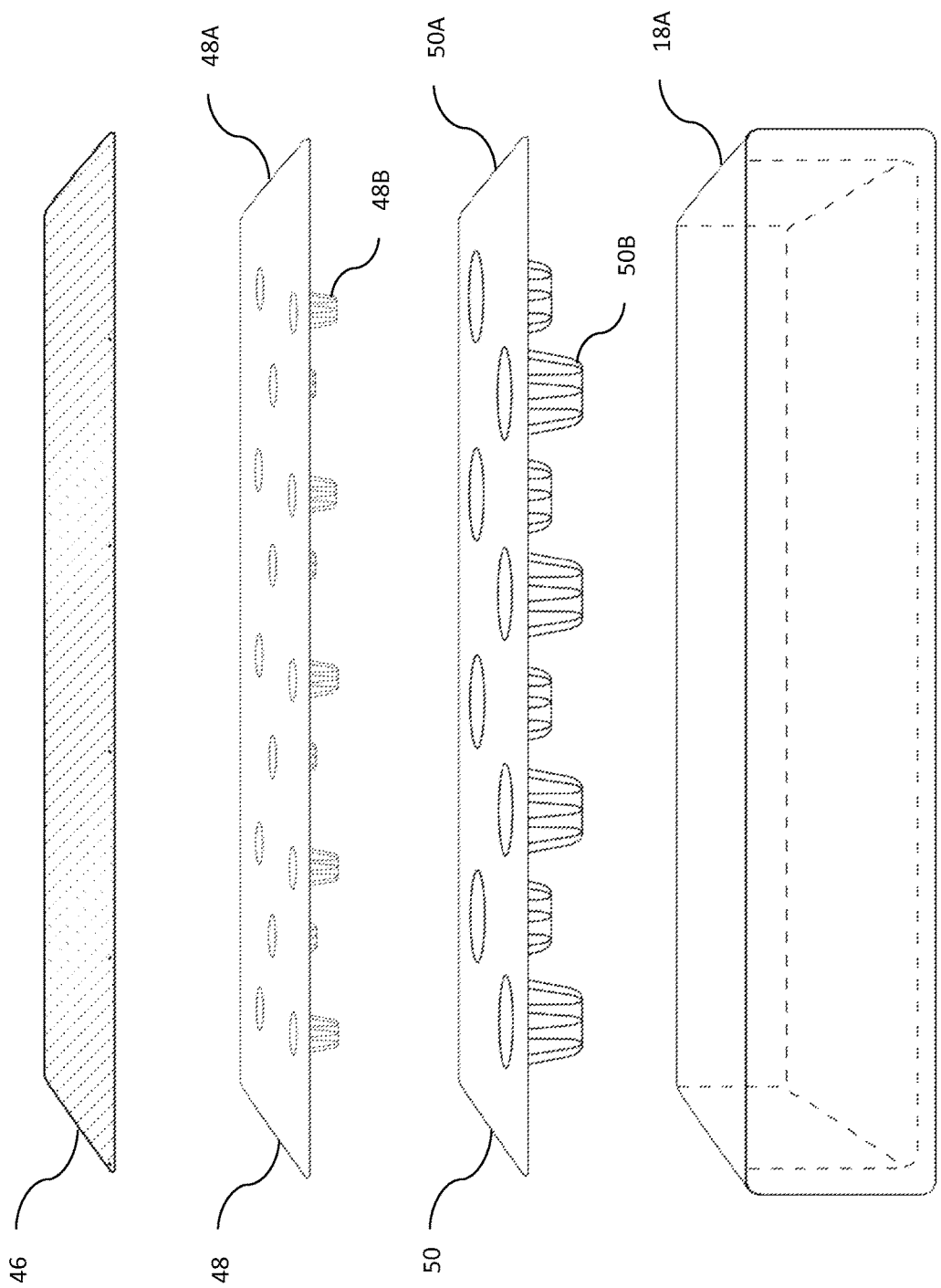
FIG. 8 is a front perspective detailed view of the first-size tray of FIG. 1B and three different insertable plant support elements.

Referring now to FIG. 8, FIG. 8 is an exploded view of an exemplary first-size tray 16A and three alternate plant support inserts 46, 48 & 50. A first plant support 46 is a support sheet of natural fiber or other synthetic material known in the art having desirable qualities for promoting plant growth such as moisture retention capabilities. A second plant support insert 48 includes a second support sheet 48A that positions a plurality of plastic perforated baskets 48B, and a third plant support insert 50 includes a third support sheet 50A that positions a plurality of larger plastic perforated baskets 50B.

Figure 9:
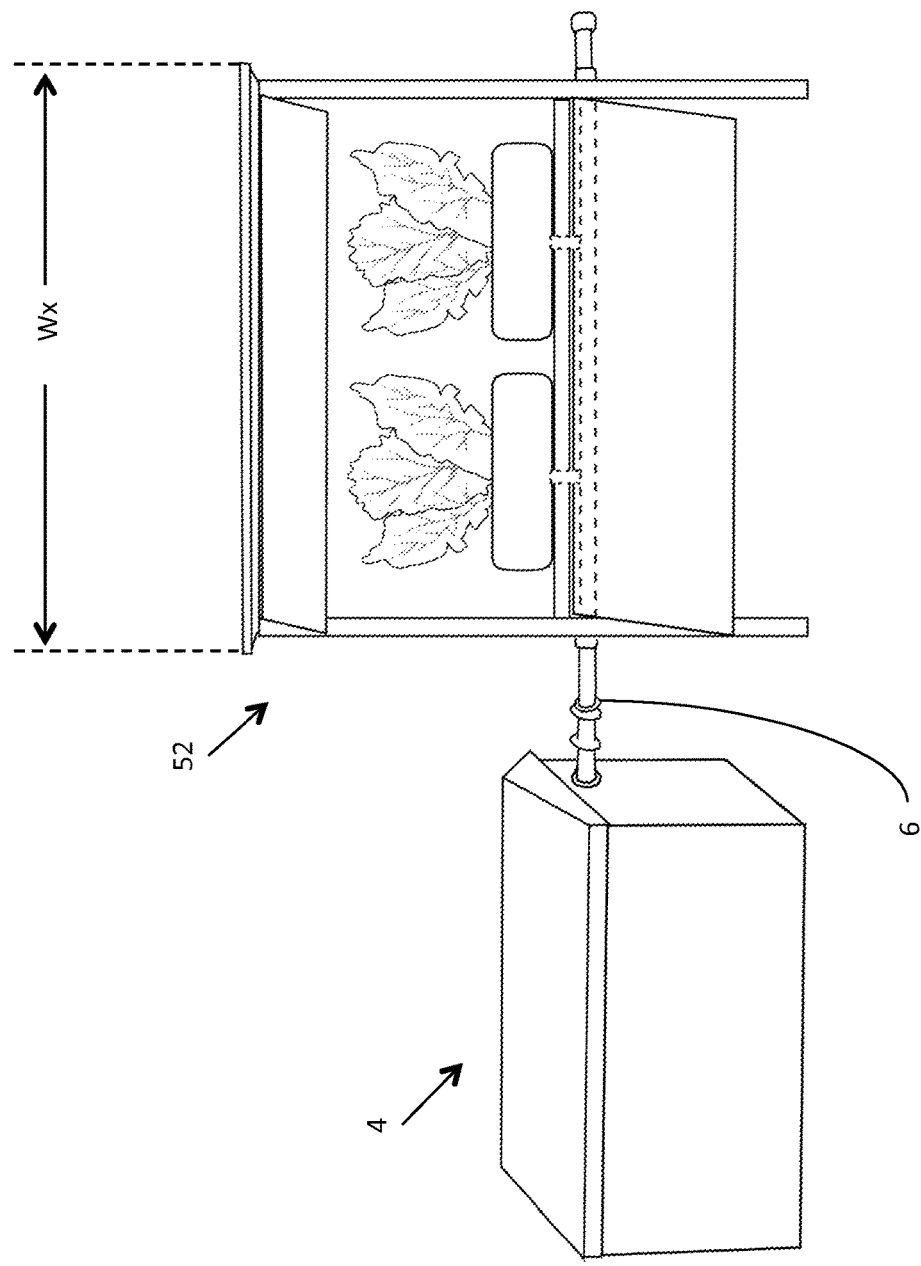
FIG. 9 is an alternate embodiment of the invented hydroponic system that is reduced in size for easier transport within buildings.

FIG. 9 is a front view of a nutrient solution reservoir 4 coupled with an alternate growth module 52 that is shaped and sized at a smaller scale to enable easier transport and installation, particularly in heavily congested urban settings. A shorter width external Wx of the alternate growth module 52, in comparison to the other invented systems cited in the present disclosure, enables the alternate growth module 52 to be more easily transported in building elevators and within buildings.

Figure 10A:
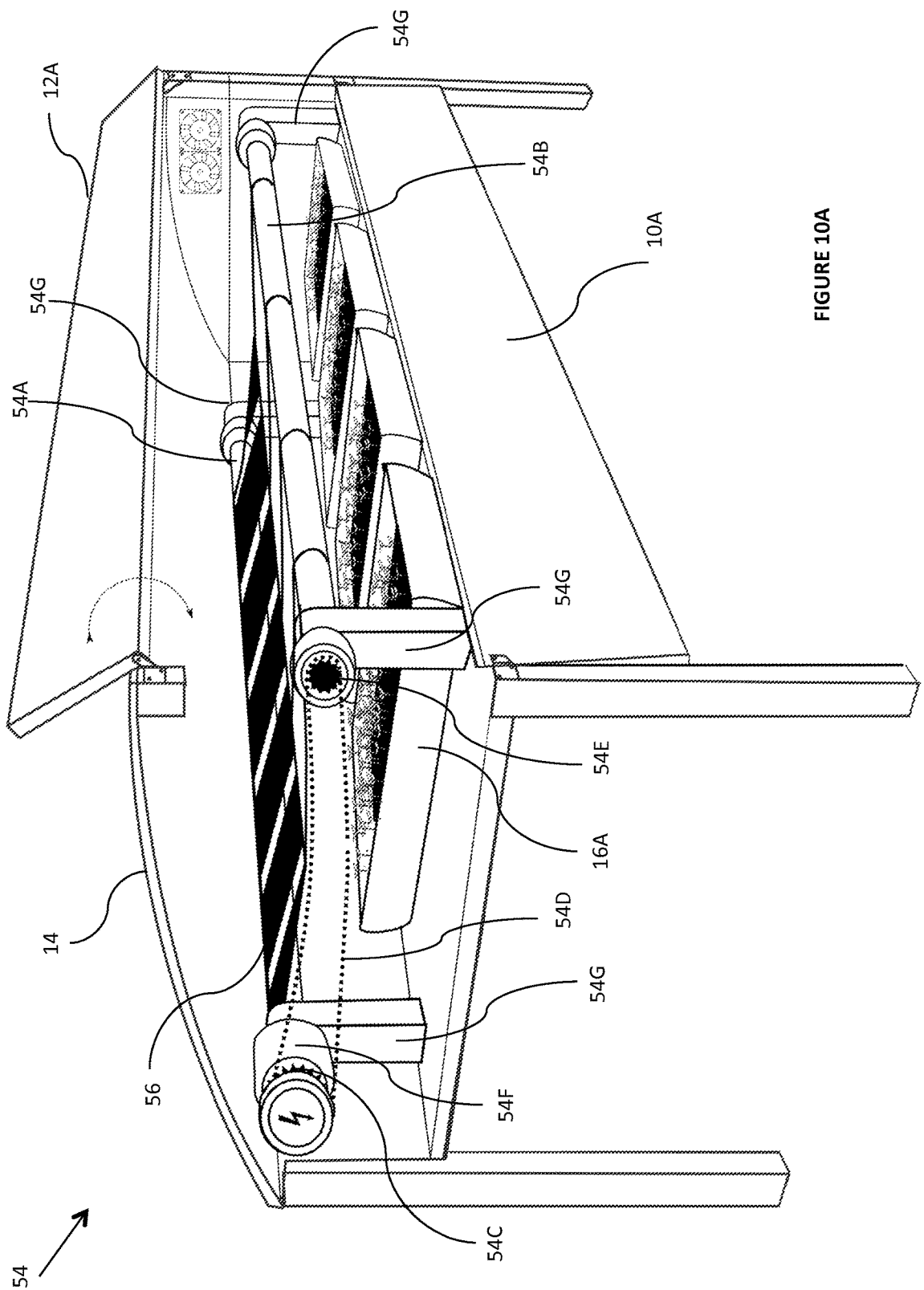

FIG. 10A is a perspective view of an optional motorized shading system 54 that is sized and shaped to reside within the growth module 8 and adjustably shield the plants 18 by filtering light energy through a sectioned shading sheet 56. A pair of rollers 54A & 54B are positioned in parallel and alternately wind and unwind the shading sheet 56.

A first gear 54C is affixed to the first roller 54A and engages with a drive chain 54D. A second gear 54E is affixed to the second roller 54B. A drive chain 54D entrains the first gear 54C with the second gear 54E, whereby the first roller 54A and the second roller 54B are entrained. A rotational motor 54F is rotatably coupled, either by direct fixation or indirect entrainment, with the first gear 54C, and rotates the first roller 54A as directed by the CPU 502. The drive chain 54D translates rotation of the first roller 54A to rotation of the second roller 54B, whereby the sectioned shading sheet 56 may be alternately wound and unwound to and from each roller 54A & 54B.

Each roller 54 & 54B is captured by at least two roller stands 54E. The roller stands 54E that maintain the rollers 54A & 54B in parallel and substantively stationary with the exception of enabling and allowing free rotational motion along the width axis W of the growth module.

The optional motorized shading system 54 can alternatively be positioned above the external top surface of the growth module lid.

Figure 10B:
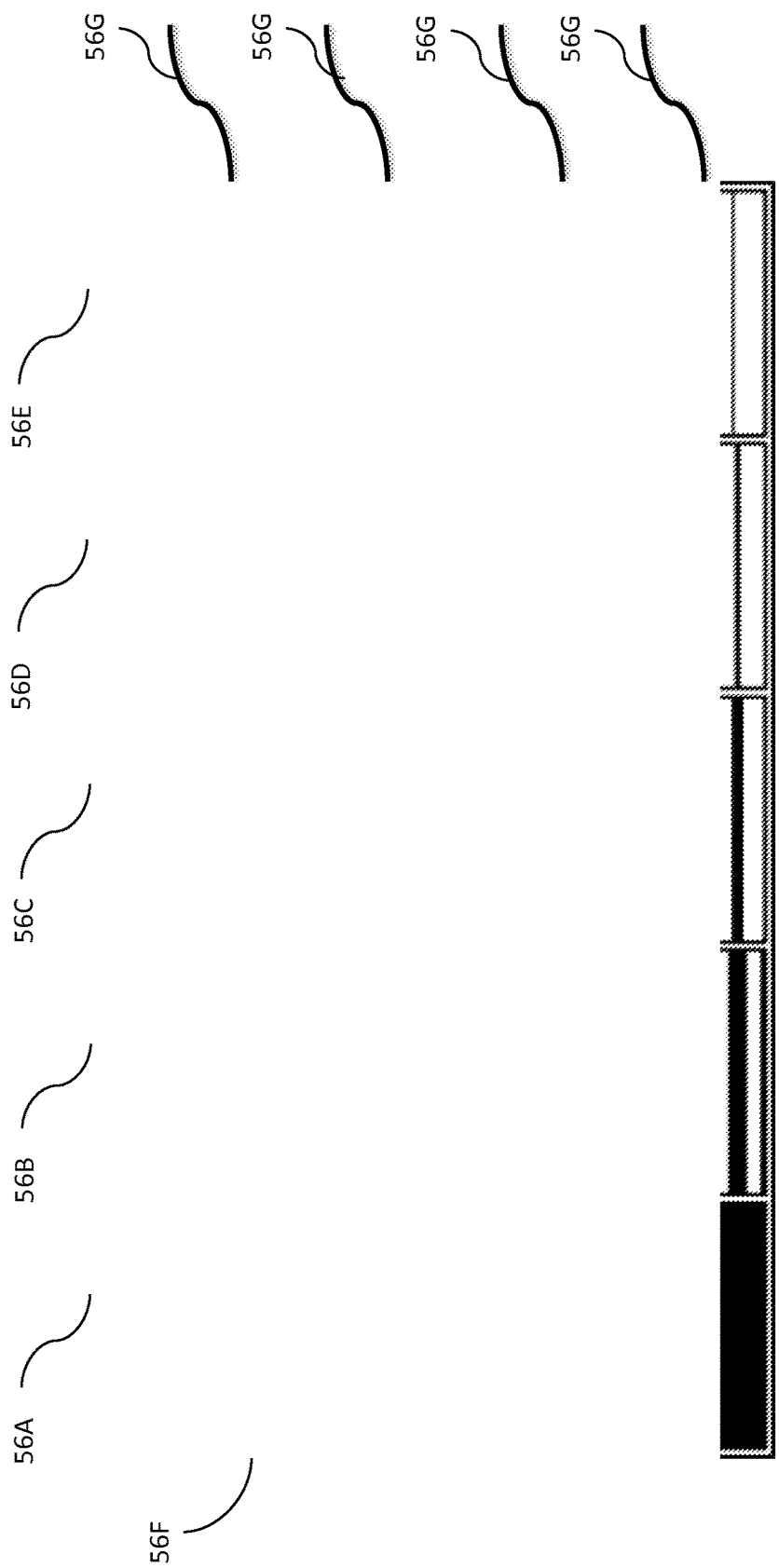

FIG. 10B is a top view of the sectioned shading sheet 56. Each of five sections 56A-56E have different degrees of light filtering strength, such that a darkest section 56A is extremely opaque and filters a maximal light energy and a lightest section 56E is effectively translucent and filters little light energy. The sectioned shading sheet 56 is anchored to the first roller 54A along a first edge 56F and is further coupled by a plurality of strings 56G to the second roller 54B.

FIG. 10C is a schematic of a shading control system 1000 that further bi-directionally communicatively couples the CPU 502 to a light sensor 1002, an external temperature sensor 1004, an interior temperature sensor 1006 and a shading motor control interface 1008. The light sensor 1002 is adapted to measure an intensity of light and is positioned within the growth module 8. The external temperature sensor 1004 is adapted to measure air temperature and is positioned to measure air temperature external to the growth module 8. The interior temperature sensor 1006 is adapted to measure air temperature and is positioned to measure air temperature within the first volume 8V or alternately the second air volume. The shading motor control interface 1008 directs the shade motor 54D to control movement of the drive train 54C the alternately rotate the rollers 54A & 54B clockwise and counter clock wise as directed by the CPU 502.

Figure 10D:
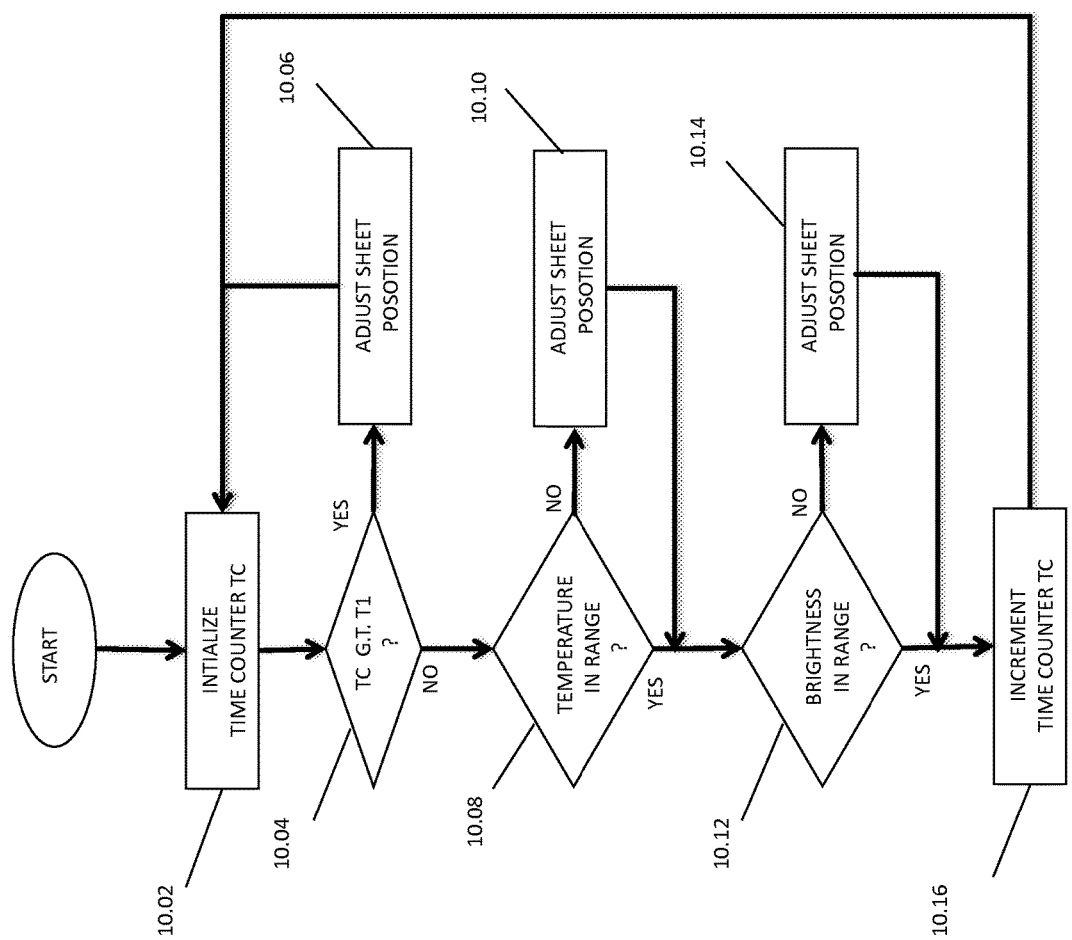

FIG. 10D is a software flowchart of a preferred embodiment of the method of controlling the positioning of the sectioned shading sheet 56 by the CPU 502 by means of driving the shade motor 54D alternately on and off, and in a clockwise rotation and a counter clockwise rotation. In step 10.02 a time counter is initialized. The time counter value is then checked in step 10.04, and if the time counter value is above a preset value T1, the CPU 502 adjusts the position of the sectioned shading sheet 56 in step 10.06 according to a prerecorded time schedule. The CPU 502 proceeds from step 10.06 to reinitialize the time counter in another execution of step 10.02. When the time counter value is not determined to be above the preset value T1, the CPU 502 proceeds from step 10.04 to step 10.08 and next determines if the current interior temperature measurement received from the interior temperature sensor 1006 is within a preset temperature range. When the CPU 502 determines that the current interior temperature measurement received from the interior temperature sensor 1006 is not within a preset temperature range, the CPU 502 proceeds from step 10.08 to step 10.10 and adjusts the position of the sectioned shading sheet 56. In the alternative, when the CPU 502 determines that the current interior temperature measurement received from the interior temperature sensor 1006 is within a preset temperature range, the CPU 502 proceeds from step 10.08 to step 10.12.

In step 10.12 the CPU 502 determines if current the brightness measurement of the light sensor 1002 is within a preset brightness range. When the CPU 502 determines that the current brightness measurement of the light sensor 1002 is not within a preset brightness range, the CPU 502 proceeds from step 10.12 to step 10.14 and adjusts the position of the sectioned shading sheet 56. In the alternative, when the CPU 502 determines that the current brightness measurement of the light sensor 1002 is within the preset brightness range, the CPU 502 proceeds from step 10.12 to step 10.16 and to increment the time counter. The CPU 502 proceeds from step 10.16 to step 10.02.

Figure 11:
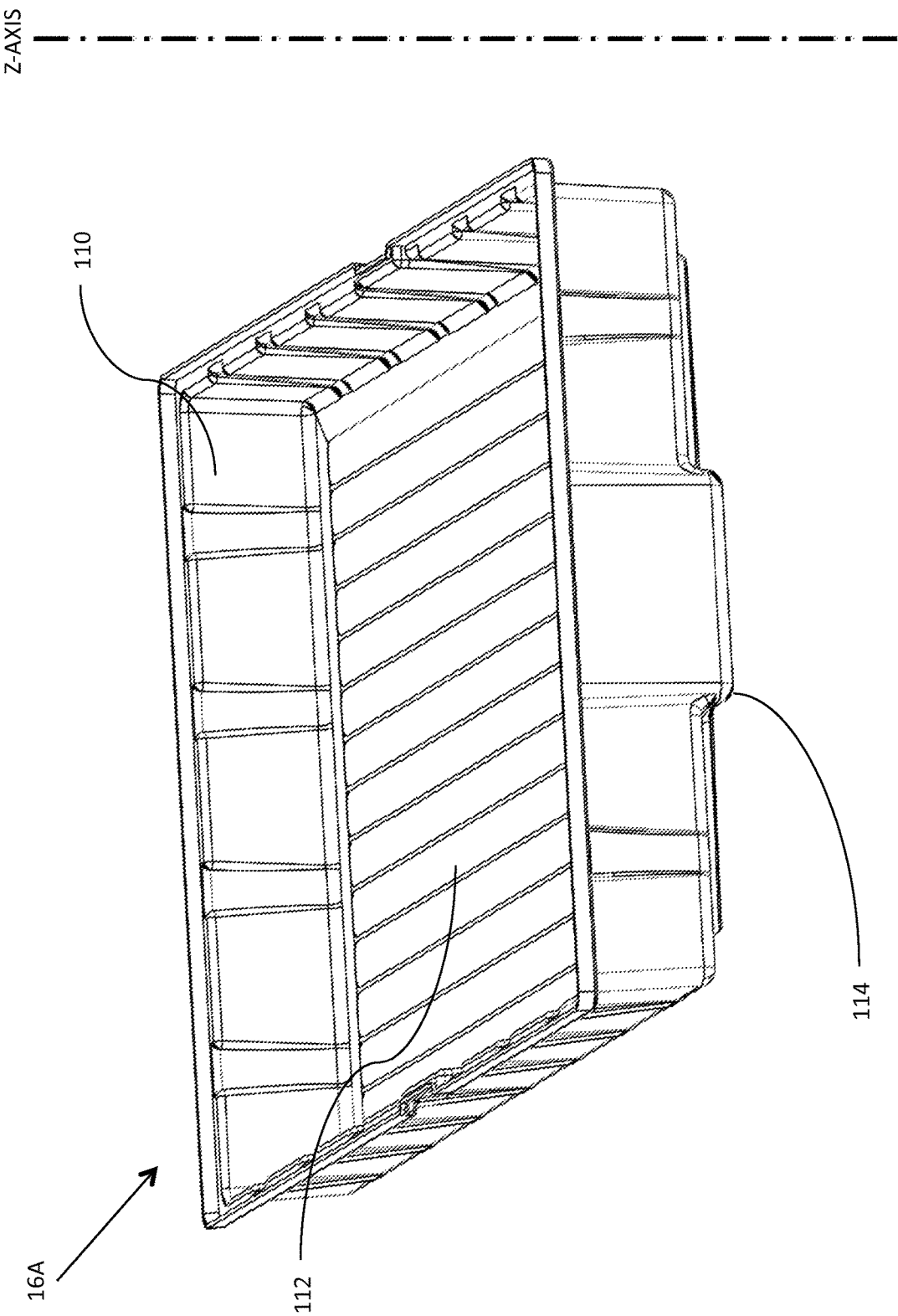
FIG. 11 is a perspective of the first-size tray of FIG. 1B.

FIG. 11 is a perspective of the first-size tray cultivation vessel 16A. The tray 16A provides an interior cavity 110 of a suitable volume to support proper root growth for cultivated plants 18 whereby nutrient solution 44 flowing into the cultivation vessel 16A from the distribution manifold can rise to a level sufficient to saturate the roots of cultivated plants 18 and associated growth medium. The cultivation tray 16A may provide a textured bottom contour 112 to support the plant support inserts depicted in FIG. 8 and induce drainage flow. The cultivation vessel 16A may also provide a coupling sump 114 at the lowest point of the vessel 16A to enable coupling of the cultivation vessel 16A to the distribution manifold 8T whereby the cultivation vessel 16A can be completely drained of nutrient solution 44 without decoupling the cultivation vessel 16A from the distribution manifold 8T.

Figure 12:
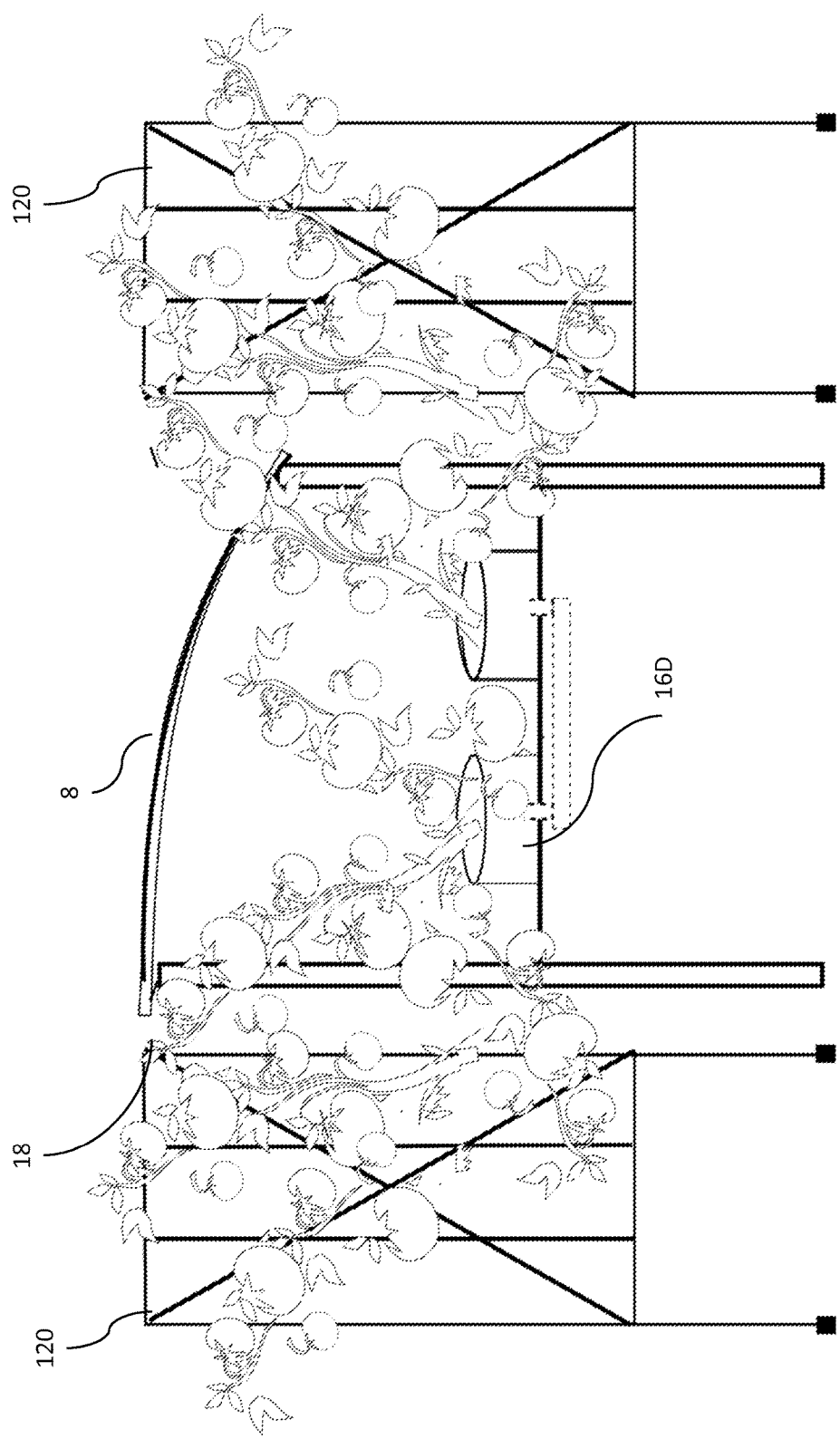
FIG. 12 is a perspective view of an optional trellis configuration in combination with invented hydroponic system of FIG. 1A through 1C.

FIG. 12 is a perspective view of a plurality of trellis structures 120 that may optionally be coupled to the exterior of the growth module 8 to support plants 18 growing out of the cultivation vessels 16D whereby the overall cultivation footprint of a growth module 8 can be expanded.

Figure 13:
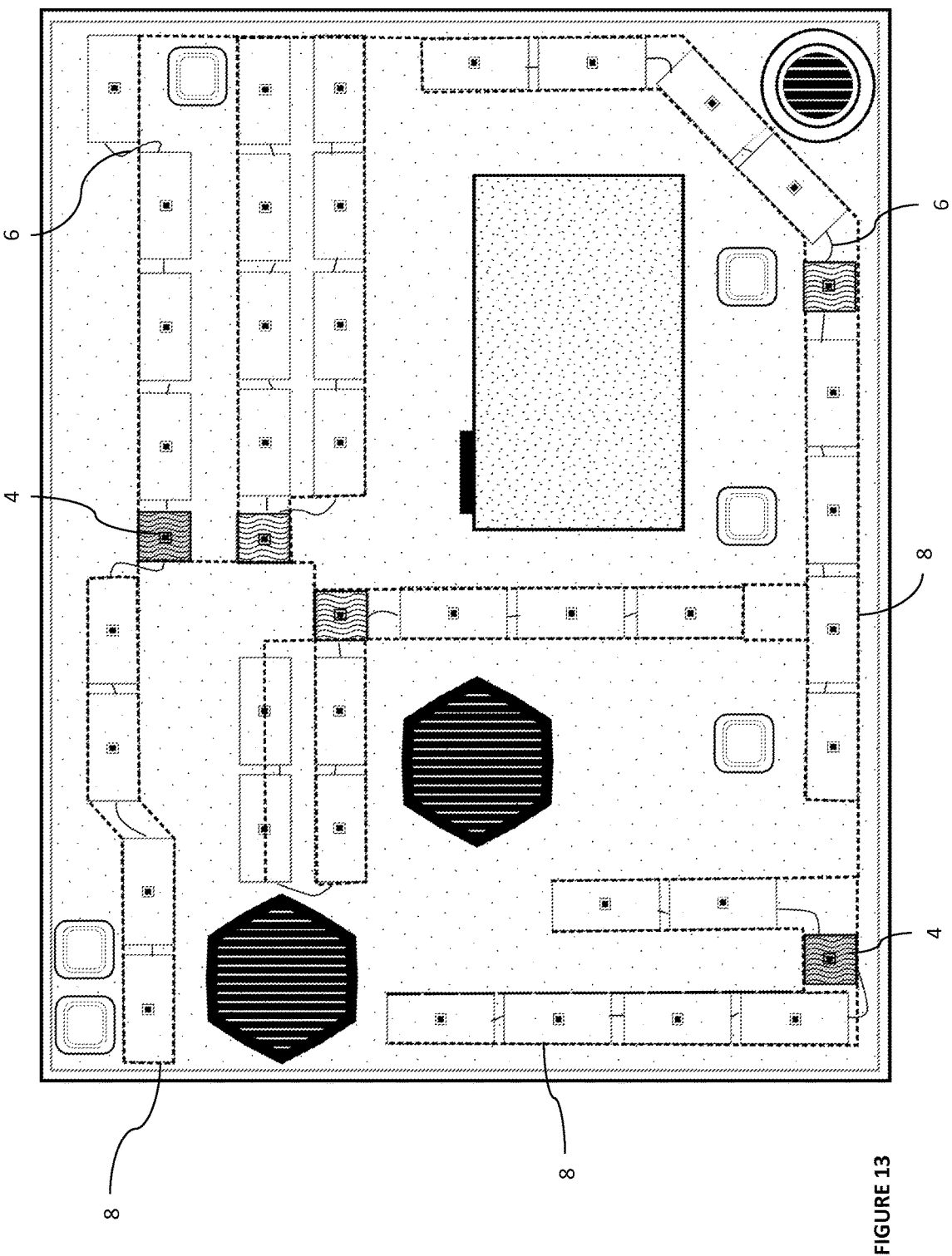
FIG. 13 is a top view of a roof top installation of a plurality of the invented system of FIG. 1.

FIG. 13 is top view of a roof top installation of a plurality of the invented systems 2. The inventive modular nature of the present invention enables customized configuration on a large scale with pluralities of growth modules 8 that may be directly or indirectly coupled to a reservoir.

The present invention provides many benefits over the prior art of hydroponic systems designed primarily for outdoor use. Such benefits include 1) The invented system provides many of the same environmental control benefits associated with modern greenhouse cultivation, while enabling a farming method that does not require human presence inside the cultivation area. This allows the hydroponic system to be smaller and lighter, which can mitigate structural and coding challenges when contemplating roof top installations. 2) The modular re-configurability of the growth modules, whereby the cultivation area can be expanded and contracted while providing different levels of insulation, enables the cultivation of a wide variety of crops using substantially the same equipment. 3) The de-mountable cultivation trays allow for labor intensive activities such as crop planting and harvesting to occur at a location removed from the cultivation modules to increase work-flow flexibility. 4) The numerous possible clustered layout configurations enabled by coupling a plurality of cultivation modules to a singe reservoir enables tremendous spatial flexibility so that the inventive system can be located and operated within the "nooks and crannies" of the urban landscape and optionally in close proximity to sources of waste heating and cooling energy. 5) The integrated CPU-based operational automation reduces the need for human interaction with the inventive system such that the equipment can be placed in areas that are relatively hard to reach, such as roof tops. 6) The growth modules have a lower aerodynamic profile than conventional greenhouses, which reduces structural stress from wind loading and enables the inventive system to be camouflaged to mitigate aesthetic objections from historic commissions and neighbors. 7) The modularity of the growth modules allows for farm expansion and contraction on a linear scale.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A hydroponics system comprising: a cultivation vessel ("vessel") adapted to support at least one plant; a box having a positionable wall element located at a lateral side of the box, the box adapted to support the vessel at a horizontal loading plane, the positionable wall element adapted to be alternately placed in a first position that substantively extends vertically from and above the horizontal loading plane and a second position that permits placement and withdrawal of the vessel along the horizontal loading plane; the vessel comprising an internal vessel port ("port"), the port adapted to enable a bidirectional free flow of fluid into and from the vessel; a connective tubing extending through the box and coupled to the vessel at the port; and a fluid source coupled to the connective tubing, the fluid source adapted to alternately force the fluid into the vessel via the connective tubing and to receive the fluid from the vessel via the connective tubing.

2. The hydroponics system of claim 1, wherein the positionable wall element is detachably attachable to the box and is decoupled from the box when in the second position.

3. The hydroponics system of claim 1, wherein the fluid source comprises an adjustable overflow drain adapted to adjustably limit a level of the fluid within the vessel.

4. The hydroponics system of claim 1, wherein the fluid comprises plant nutrients.

5. The hydroponics system of claim 1, wherein the vessel is adapted to support a plurality of plants.

6. The hydroponics system of claim 1, further comprising:
a second cultivation vessel ("second vessel"), the second vessel comprising a second internal vessel port ("second port"), the second port adapted to enable the bidirectional free flow of the fluid into and from the second vessel via the connective tubing; and
the second vessel additionally adapted to be simultaneously placed with a vessel within the box while supported by the box.

7. The hydroponics system of claim 6, further comprising:
the second port of the second vessel adapted to enable the bidirectional free flow of the fluid into and from the second vessel via a second connective tubing; and
the second connective tubing coupled to a second fluid source, the second fluid source adapted to alternately force the fluid into the second vessel via the second connective tubing and to receive the fluid from the second vessel via the second connective tubing.

8. The hydroponics system of claim 6, wherein the fluid source comprises an irrigation level adjusting unit to adjustably limit the level of the fluid within the vessel and the level of fluid within the second vessel.

9. The hydroponics system of claim 6, wherein an irrigation level adjusting unit comprises an adjustable overflow drain adapted to adjustably limit the level of fluid within the first vessel and within the second vessel.

10. The hydroponics system of claim 6, wherein the fluid source comprises an irrigation level adjusting unit to limit the level of fluid within the vessel and the level of fluid within the second vessel to a preset level.

11. The hydroponics system of claim 10, wherein the second pumping fluid source comprises an irrigation level adjusting unit to limit the level of fluid to a second preset level within the second vessel.

12. The hydroponics system of claim 8, wherein the second fluid source comprises a second irrigation level adjusting unit to adjustably limit the level of fluid to a preset level within the second vessel.

13. The hydroponics system of claim 1, wherein the port comprises an aperture positioned in and at a lowest internal location of the vessel.

14. A hydroponics system comprising: a plurality of cultivation vessels ("vessel") adapted to support at least one plant, each of the vessels comprising an internal vessel port ("port"), each of the ports adapted to enable a bidirectional free flow of fluid into and from the each of the vessels; a plurality of boxes, each of the boxes supporting at least one vessel of the plurality of vessels, and each of the boxes having a positionable wall element located at a lateral side of each of the boxes, wherein each of the boxes is adapted to support at least one vessel of the plurality of vessels at a horizontal loading plane of each of the boxes, and the positionable wall element of each of the boxes adapted to be alternately placed in a first position that substantively extends vertically from and above the horizontal loading plane of each of the boxes and a second position that permits placement and withdrawal of at least one vessel of the plurality of vessels along the horizontal loading plane of an enclosing box; a connective tubing extending through each of the boxes and coupled to each port; and a fluid source coupled to the connective tubing, the fluid source adapted to alternately force the fluid into the vessels via the connective tubing and to receive the fluid from the vessels via the connective tubing.

15. The hydroponics system of claim 14, wherein the fluid source comprises an irrigation level adjusting unit to limit the level of the fluid to a preset level within at least one vessel of the plurality of vessels.

16. The hydroponics system of claim 15, wherein the fluid source comprises an adjustable overflow drain adapted to adjustably limit a level of the fluid within the vessels.

17. The hydroponics system of claim 16, further comprising a second fluid source coupled to the connective tubing, the second fluid source adapted to alternately force the fluid into another vessel of the plurality of vessels via the connective tubing and to receive the fluid from the other vessel via the connective tubing, wherein the second fluid source comprises a second irrigation level adjusting unit to adjustably limit the fluid within at least one additional vessel to a second adjustable level within the at least one additional vessel.

18. The hydroponics system of claim 14, wherein the fluid comprises plant nutrients.

19. The hydroponics system of claim 14, wherein at least one vessel is adapted to support a plurality of plants.

20. The hydroponics system of claim 14, wherein at least one of the plurality of boxes is adapted to support at least two vessels of the plurality of vessels.

21. A method comprising: a. providing a hydroponics system comprising: i. a cultivation vessel adapted to support at least one plant; ii. a fluid source coupled with a connective tubing, the fluid source adapted to alternately force a fluid into the cultivation vessel via the connective tubing and to receive the fluid from the vessel via the connective tubing; and iii. a box having a positionable wall element located at a lateral side of the box, the box adapted to support the cultivation vessel at a horizontal loading plane and the positionable wall element adapted to be alternately placed in a first position that substantively extends vertically from and above the horizontal loading plane and a second position that permits placement and withdrawal of the cultivation vessel along the horizontal support plane; b. placing the positionable wall element in the second position; and c. inserting the cultivation vessel into the box along an insertion path positioned at the horizontal loading plane; and d. employing the fluid source to alternately force the fluid into the cultivation vessel via the connective tubing and to receive the fluid from the cultivation vessel via the connective tubing.

* * * * *